United States Patent
Bendtson et al.

(10) Patent No.: US 12,470,673 B2
(45) Date of Patent: Nov. 11, 2025

(54) COMPUTER-IMPLEMENTED METHOD, COMPUTER PROGRAM AND APPARATUS FOR VIDEO PROCESSING AND FOR GENERATING A THUMBNAIL FROM A VIDEO SEQUENCE, AND VIDEO SURVEILLANCE SYSTEM COMPRISING SUCH AN APPARATUS

(71) Applicant: CANON KABUSHIKI KAISHA, Tokyo (JP)

(72) Inventors: Jimmi Bendtson, Brøndby (DK); Amanda Lee Løje, Brøndby (DK); Nicolai Henriksen, Brøndby (DK); Morten Lundberg, Brøndby (DK)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 18/249,315

(22) PCT Filed: Sep. 29, 2021

(86) PCT No.: PCT/EP2021/076772
§ 371 (c)(1),
(2) Date: Apr. 17, 2023

(87) PCT Pub. No.: WO2022/083990
PCT Pub. Date: Apr. 28, 2022

(65) Prior Publication Data
US 2023/0396741 A1    Dec. 7, 2023

(30) Foreign Application Priority Data

Oct. 23, 2020  (GB) ........................................ 2016885
Oct. 23, 2020  (GB) ........................................ 2016890

(51) Int. Cl.
*G06V 20/52* (2022.01)
*G06V 20/40* (2022.01)
(Continued)

(52) U.S. Cl.
CPC ............. *H04N 7/181* (2013.01); *G06V 20/47* (2022.01); *G06V 20/52* (2022.01); *G11B 27/22* (2013.01); *G11B 27/34* (2013.01)

(58) Field of Classification Search
CPC ........ H04N 7/181; G06V 20/52; G06V 20/47; G11B 27/22; G11B 27/34
See application file for complete search history.

(56) References Cited

U.S. PATENT DOCUMENTS 6,741,655 B1 *  5/2004  Chang ................. G06F 16/7854
                                                707/E17.02
9,871,994 B1 *  1/2018  Vaden .................... G11B 27/34
(Continued)

*Primary Examiner* — Thai Q Tran
*Assistant Examiner* — Jose M Mesa
(74) *Attorney, Agent, or Firm* — Canon U.S.A., Inc. IP Division

(57) ABSTRACT

A computer-implemented method of video processing is provided. The method comprises obtaining a first video sequence of a target area comprising a first predetermined object or activity of interest and obtaining a second video sequence of the target area comprising a second predetermined object or activity of interest. The method further comprises determining whether a recording period of the first video sequence and a recording period of the second video sequence overlap for a time period; and in a case where the recording periods of the first and second video sequences overlap for a time period, defining at least one first video clip using frames of the first and/or second video sequence(s) from at least the time period of overlap.

19 Claims, 18 Drawing Sheets

(51) Int. Cl.
*G11B 27/22* (2006.01)
*G11B 27/34* (2006.01)
*H04N 7/18* (2006.01)

(56) References Cited

U.S. PATENT DOCUMENTS

| | | |
|---|---|---|
| 10,360,946 B1 * | 7/2019 | Pasala .................. G11B 27/036 |
| 2005/0246373 A1 | 11/2005 | Faulkner et al. |
| 2007/0162873 A1 | 7/2007 | Haro et al. |
| 2007/0237225 A1 | 10/2007 | Luo et al. |
| 2011/0182512 A1 | 7/2011 | Nishi |
| 2013/0091432 A1 | 4/2013 | Shet et al. |
| 2015/0106721 A1 | 4/2015 | Cha et al. |
| 2016/0086462 A1 | 3/2016 | Meganathan et al. |
| 2017/0109601 A1 | 4/2017 | Gurwicz et al. |
| 2017/0352380 A1 | 12/2017 | Doumbouya et al. |
| 2019/0080003 A1 | 3/2019 | Alcantara et al. |
| 2020/0097734 A1 | 3/2020 | Miyake et al. |
| 2020/0159768 A1 | 5/2020 | Henriksen |
| 2020/0314356 A1 * | 10/2020 | Storer .................... G06T 7/194 |

\* cited by examiner

```
###############################
SP1-R01:[    ------|------         ]
SP1-R02:[           ------|------  ]
*********************************
OR     :[           ------|        ] {SP1-R01}
OR     :[                 |------  ] {SP1-R02}
*********************************
AND    :[           ------|        ] {SP1-R01}
AND    :[           ------|------  ] {SP1-R02}
###############################
```

FIGURE 6

```
###############################
SP1-R01:[ -----|------             ]
SP2-R01:[           ------|------  ]
*********************************
OR     :[ -----|                   ] {SP1-R01}
OR     :[           ------|------  ] {SP2-R01}
*********************************
AND    :[NONE                      ]
###############################
```

FIGURE 7

```
#################################################
SP1-R01:[    -----|-----                        ]
SP2-R01:[          -----|-----                  ]
*************************************************
OR     :[    -----|----------                   ] {SP1-R01,SP2-R01}
*************************************************
AND    :[          |----                        ] {SP1-R01,SP2-R01}
#################################################
```

FIGURE 8

```
#################################################
SP1-R01:[    -----|-----                        ]
SP2-R01:[          -----|-----                  ]
SP2-R02:[                    -----|-----        ]
*************************************************
OR     :[    -----|----------                   ] {SP1-R01,SP2-R01}
OR     :[                    -----|-----        ] {SP2-R02}
*************************************************
AND    :[          |----                        ] {SP1-R01,SP2-R01}
#################################################
```

FIGURE 9

```
##############################################
SP1-R01:[    ------|---------               ]
SP2-R01:[                  ------|-----     ]
SP3-R01:[ ------|-----                      ]
SP3-R02:[                       ------|---- ]
**********************************************
OR     :[     ------|---------              ]  {SP1-R01,SP3-R01}
OR     :[                  ------|--------- ]  {SP2-R01,SP3-R02}
**********************************************
AND    :[NONE                               ]
##############################################
```

FIGURE 10

```
################################################
SP1-R01:[      ---------|                       ]  {SP1-R01,SP2-R01,SP3-R02}
SP2-R01:[          -----|-------                ]
SP3-R01:[                  -----|-----          ]
SP3-R02:[        --|---                         ]
SP3-R03:[                               --|---- ]
************************************************
OR     :[      ---------|-------                ]  {SP1-R01,SP2-R01,SP3-R02}
OR     :[          -----|-----                  ]  {SP2-R01,SP3-R01}
OR     :[                               --|---- ]  {SP3-R03}
************************************************
AND    :[          -----|-                      ]  {SP1-R01,SP2-R01,SP3-R02}
################################################
```

FIGURE 12

```
###############################################
* SP1-R01  :[────┼────]                        *
* SP2-R01  :[────────┼────]                    *
*                                              *
* OR       :[────┼────]        ] {SP1-R01}     *
* OR       :[────────┼────]    ] {SP2-R01}     *
*                                              *
* AND      :[NONE]                             *
###############################################
```

FIGURE 13

```
###############################################
* SP1-R01  :[────┼──────]                      *
* SP2-R01  :[──┼──]                            *
*                                              *
* OR       :[────┼──────]     ] {SP1-R01,SP2-R01} *
*                                              *
* AND      :[──┼──]           ] {SP1-R01,SP2-R01} *
###############################################
```

FIGURE 14

COMPUTER-IMPLEMENTED METHOD, COMPUTER PROGRAM AND APPARATUS FOR VIDEO PROCESSING AND FOR GENERATING A THUMBNAIL FROM A VIDEO SEQUENCE, AND VIDEO SURVEILLANCE SYSTEM COMPRISING SUCH AN APPARATUS

CROSS REFERENCE TO RELATED APPLICATION

This application is the National Phase application of PCT Application No. PCT/EP2021/076772, filed on Sep. 29, 2021. This application claims the benefit under 35 U.S.C. § 119 (a)-(d) of United Kingdom Patent Application Nos. 2016890.2 and 2016885.2, both filed on Oct. 23, 2020, and titled "COMPUTER-IMPLEMENTED METHOD, COMPUTER PROGRAM AND APPARATUS FOR VIDEO PROCESSING, AND VIDEO SURVEILLANCE SYSTEM COMPRISING SUCH AN APPARATUS" and "COMPUTER-IMPLEMENTED METHOD, COMPUTER PROGRAM AND APPARATUS FOR GENERATING A THUMBNAIL FROM A VIDEO SEQUENCE". The above cited patent applications are incorporated herein by reference in their entirety.

TECHNICAL FIELD OF THE INVENTION

The present disclosure relates to a computer-implemented method, a computer program and an apparatus for video processing, and to a video surveillance system comprising such an apparatus. The present disclosure also relates to a computer-implemented method, a computer program and an apparatus for generating a thumbnail from a video sequence. In particular, the present disclosure relates to the field of video surveillance where there is a need for processing video sequences showing different objects or activities of interest and generating thumbnails thereof.

BACKGROUND OF THE INVENTION

Video surveillance systems generally include a large number of video cameras which record video data upon detection of an object and/or activity in the field of view of one or more video cameras. These video cameras can be activated upon detection of an object and/or activity by one or more sensors which operate all the time, and which cover a wider area than that of the video cameras. Thus, the recording by a video camera can advantageously be activated when an object and/or activity appears in a target area of the video camera and deactivated the rest of the time. Such a way of operating allows to limit the recording of video sequences to potentially important events and to limit the storage capacity needed for operating the video surveillance system.

The recorded video sequences are generally stored in one or more recording servers and can be accessed by an operator or user who wishes to retrieve video sequences of an object or activity of interest. The operator will generally rely on metadata generated by video analytics software and query the metadata with one or more search plugins to find relevant video sequences. The one or more search plugins are advantageously able to query metadata in different databases, which can be external and/or independent from one another (or have no natural way of sharing information). Such databases may advantageously be created by different participants (e.g. partners or third parties). These different databases may advantageously comprise metadata related to the same video sequences, e.g. one database may comprise metadata related to colors of vehicles and another database may comprise metadata related to the makes and/or models of vehicles which are detected by one or more video cameras. One database may also comprise metadata related to the weather in the video sequences to which it relates.

The metadata may also be accessed via on-demand queries over web resources, or in any other appropriate way.

The metadata can also advantageously be supplied in the form of a metadata stream in a Virtual (or Virtualization) Management Software (VMS).

It is therefore usually possible to attach (or combine or associate) metadata from different sources to video sequences originating from a single video camera, or from different video cameras. In other words, there is in some instances no need for a one-to-one relationship between one piece of metadata and a video camera.

Many video analytics software modules are available which can analyse video surveillance data and detect specific objects or activity. These will typically attach metadata to the video stream indicating a time and position in the frame where the objects or activity have been detected, together with data describing the nature of the detected object or activity. Examples of types of object which can be detected are people, cars, licence plates etc. Some object recognition algorithms are sophisticated enough to categorise people by age and gender, and metadata can indicate characteristics of detected objects such as colour or type of vehicle or age of a person or gender of a person. Some video analytics modules can also detect activity such as patterns of behaviour such as loitering, and these can also be indicated by metadata included in the video surveillance data and associated with the video data. Once metadata has been included in video surveillance data, it can be used to conduct searches for particular objects, activities or events. For example, a search could be carried out for a black SUV, or a person of a particular age, gender and hair colour, or a vehicle with a particular license plate.

Video analytics software which generate metadata can be run in various locations. Analytics software can be run on the video camera, on an analytics server, a recording server or at a client device. In a cloud-based system, video analytics may be run in the cloud.

Several problems appear when an operator or user wishes to retrieve video sequences of a target area matching two or more search criteria during a particular period of time.

First, as a result of his/her search, the user may be presented with video sequences from each of the search plugins used for the search, i.e. each search plugin will provide search results for whatever criteria it looks for even if these search results are redundant with search results from another search plugin. For instance, a first search plugin will provide a video sequence comprising a man with a particular hair color, a second search plugin will provide a video sequence comprising a man from a particular age group, and a third search plugin will provide a video sequence comprising a car of a particular color. If the user has specified that he/she is looking for these criteria, it is not necessarily useful to the user to be presented with three video sequences showing the same scene at the same time. The problem is compounded when one or more search plugins provide several search results. Moreover, the user is not able to combine, view and process all of these video sequences provided by their associated metadata to create a coherent understanding of how these video sequences match the search criteria. In summary, the user is presented with too many search results, which will entail a time-consuming analysis of all the video sequences.

Second, the user is not able to specify how closely the search results should match the search criteria. For instance, the user cannot narrow down the number of search results by adding more search plugins (and thus criteria) because each plugin will provide additional search results. Thus, in an environment where many video cameras generate a lot of recorded video sequences (e.g. in a shopping mall), there is a trade-off for the user between adding more search criteria to generate relevant search results and limiting the number of search results to a reasonable number by limiting the number of search criteria. Moreover, the user is not able to choose to be presented with search results that only match some of the search criteria, for instance, when the user is unsure about one criterion (e.g. whether the car he/she is looking for is blue or black). In summary, the content of the video sequences presented as search results may not properly match the user's search request.

Thus, there is a general need to better address such a user's search request by improving the relevance of the search results.

Furthermore, there is also a need to improve the way the search results are presented (or displayed) to the user by defining more relevant thumbnails, which show the two objects or activities of interest searched by the user.

More particularly, if a video sequence to be presented as a result of a search performed by the user is a sequence (or clip) created from two video sequences separately recorded upon detection of a particular object and/or activity, there is a need to define a thumbnail for this clip.

The technical solutions presented in the present disclosure and appended claims aim to address at least one of the above problems.

SUMMARY OF THE INVENTION

The present invention provides a computer-implemented method of video processing, comprising: obtaining a first video sequence of a target area comprising a first predetermined object or activity of interest; obtaining a second video sequence of the target area comprising a second predetermined object or activity of interest; determining whether a recording period of the first video sequence and a recording period of the second video sequence overlap for a time period; and in a case where the recording periods of the first and second video sequences overlap for a time period, defining at least one first video clip using frames of the first and/or second video sequence(s) from at least the time period of overlap.

Optionally, the method comprises: obtaining at least one additional video sequence of the target area, each additional video sequence comprising a predetermined object or activity of interest in the target area and having a recording period; determining whether the recording period of each additional video sequence overlaps with the recording periods of any other additional video sequences and/or with the recording periods of the first and/or second video sequence(s) for a time period; in a case where the recording period of an additional video sequence and a recording period of any other video sequence among the first, second and other additional video sequences overlap for a time period, defining at least a second video clip using frames of the additional and/or other video sequence(s) from the time period of overlap.

Optionally, all the said video sequences originate from a single video camera.

Optionally, the target area corresponds to a field of view of a single video camera.

Optionally, all the said predetermined objects are types of objects chosen from a group of objects consisting of vehicles, license plates, people and animals.

Optionally, at least the first video clip comprises all the frames of the first or second video sequence from the time period of overlap.

Optionally, at least the first video clip further comprises all the frames of the first and/or second video sequence(s) from before and after the time period of overlap.

Optionally, the method further comprises: identifying a first frame of the first video clip comprising the first predetermined object or activity of interest; identifying a second frame of the first video clip comprising the second predetermined object or activity of interest; and generating a thumbnail using at least part of the first frame and at least part of the second frame of the first video clip, the thumbnail including the first and second predetermined object or activity.

Optionally, the method further comprises generating the thumbnail by: extracting the first or second predetermined object or activity from one frame of the two frames; and overlapping the extracted first or second predetermined object or activity with the other of the two frames.

Optionally, the method further comprises generating the thumbnail by: extracting the first and second predetermined object or activity from the two frames; and overlapping the extracted first and second predetermined object or activity with a predetermined background.

Optionally, the first and second predetermined object or activity are enlarged on the predetermined background.

Optionally, the method further comprises displaying as the thumbnail each of said two frames one after the other.

Optionally, the first and second predetermined object or activity are each contained inside a bounding box on the thumbnail.

Optionally, the first and/or second predetermined object(s) are types of objects chosen from the group of objects consisting of vehicles, license plates, people and animals.

Optionally, the first video clip comprises metadata defining a start time and an end time of the first video clip.

Optionally, the method further comprises searching the first video clip based on object or facial recognition, motion, or bounding boxes existing in the first video clip, or searching content metadata associated with the first video clip so as to identify the first and second predetermined object or activity of interest prior to identifying the said first and second frames.

Optionally, searching content metadata comprises sending a search request to an indexing server storing the content metadata and receiving search results from the indexing server indicating video frames which match the search criteria.

Optionally, the content metadata comprises trigger times corresponding to the frames including the first and second predetermined object or activity.

Optionally, the thumbnail comprises an internal border separating one frame or part thereof from the other of the two frames or part thereof, the border being positioned not to conceal the first and second predetermined object or activity.

The invention also provides a computer program which, when run on a computer, causes the computer to carry out the method according to any one of the preceding definitions.

The invention further provides a video processing apparatus, comprising at least one processor configured to: receive from a user a first query related to a first predetermined object or activity of interest and a second query related to a second predetermined object or activity of interest; obtain from at least one database a first video sequence of a target area comprising the first predetermined object or activity of interest and a second video sequence of the target area comprising the second predetermined object or activity of interest; determine whether a recording period of the first video sequence and a recording period of the second video sequence overlap for a time period; in a case where the recording periods of the first and second video sequences overlap for a time period, define at least one first video clip using frames of the first and/or second video sequence(s) from the period of overlap.

Optionally, the said at least one processor is further configured to: identify a first frame of the first video clip comprising the first predetermined object or activity of interest; identify a second frame of the first video clip comprising the second predetermined object or activity of interest; and generate a thumbnail using at least part of the first frame and at least part of the second frame of the first video clip, the thumbnail including the first and second predetermined object or activity.

The invention further provides a video surveillance system comprising a video processing apparatus according to the preceding claim and a client apparatus comprising a display, the client apparatus comprising at least one processor configured to display at least the said first video clip or the thumbnail of the said first video clip.

Optionally, the client apparatus is further configured to display the said first video clip or the thumbnail of the said first video clip without displaying the first and second video sequences from which the said first video clip has been defined.

Optionally, the video surveillance system further comprises a video camera and a recording server, wherein the recording server comprises a processor configured to: cause the recording of video sequences captured from the video camera in a database in a storing medium; receive search queries from the client apparatus; extract video sequences from the database according to the search queries; and define and transmit the said one first video clip to the client apparatus.

The invention also provides a computer-implemented method of generating a thumbnail from a video sequence, comprising: identifying a first frame of a video sequence comprising a first object or activity of interest; identifying a second frame of the video sequence comprising a second object or activity of interest; and generating a thumbnail using at least part of the first frame and at least part of the second frame of the video sequence, the thumbnail including the first and second object or activity. The video sequence advantageously is the above-mentioned first video clip, and the first and second object or activity are the above-mentioned first predetermined object or activity of interest and second predetermined object or activity of interest, respectively.

BRIEF DESCRIPTION OF THE DRAWINGS

Embodiments of the present invention will now be described, by way of example only, with reference to the accompanying drawings in which:

FIGS. 4 to 16 schematically illustrate different search results that can be returned by the computer-implemented method of video processing according to the present invention;

DETAILED DESCRIPTION OF THE INVENTION

Figure 1:
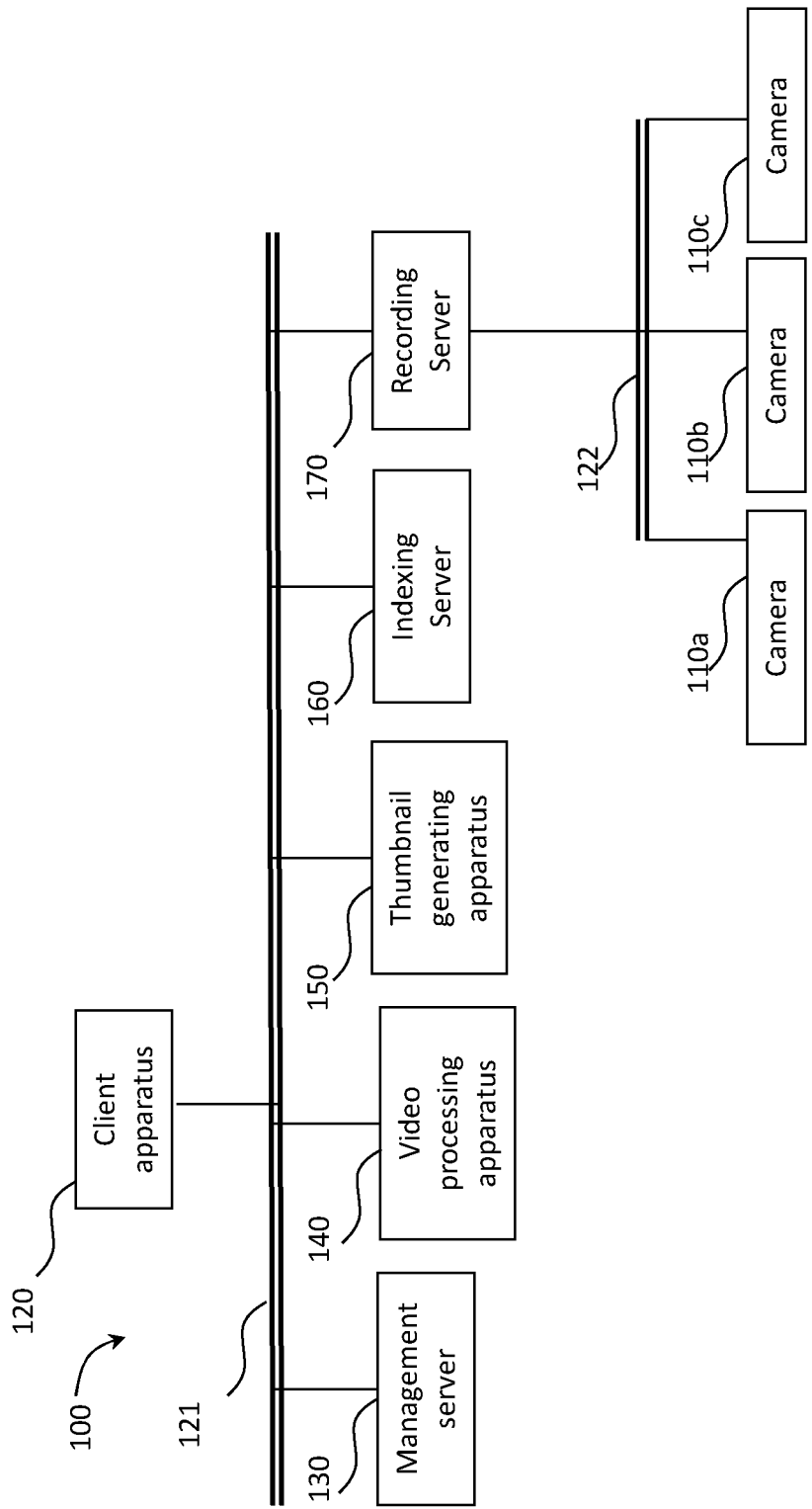
FIG. 1 schematically illustrates a video surveillance system in which the present invention can be implemented.

FIG. 1 shows an example of a video surveillance system 100 in which embodiments of the invention can be implemented. The system 100 comprises a client apparatus 120, a management server 130, a video processing apparatus 140, a thumbnail generating apparatus 150, an indexing server 160 and a recording server 170 connected to a plurality of video cameras 110a, 110b, 110c. Note that the invention is not limited to this configuration. One or more of the aforementioned servers or apparatuses may also be combined into a single apparatus or server. For instance, the functions of the client apparatus 120, video processing apparatus 140 and thumbnail generating apparatus 150 can be carried out by a single apparatus, for instance the client apparatus 120. Similarly, the functions of the management server 130, indexing server 160 and recording server 170 may be carried out by a single server, for instance the recording server 170. The invention is not limited to this configuration. Other servers or apparatuses may be present in the system 100. For example, an archiving server (not illustrated) may be provided for archiving older data stored in the recording server 170 which does not need to be immediately accessed from the recording server 170, but which the user does not desire to delete permanently. A fail-over recording server (not illustrated) may be provided in case a main recording server fails. An analytics server can also run analytics software for image analysis, for example motion or object detection, facial recognition, event detection. The functions of some of these apparatuses or servers may also be spread across different apparatuses or servers. For instance, the functions of the thumbnail generating apparatus 150 may be spread across the client apparatus 120 and the recording server 170.

The plurality of video surveillance cameras 110a, 110b, 110c send video data to the recording server 170. A client apparatus 120 is for instance a fixed terminal which provides an interface via which an operator can view video data live from the video cameras 110a, 110b, 110c, or recorded video data from the recording server 170.

The video cameras 110a, 110b, 110c capture image data and send this to the recording server 170 as a plurality of video data streams.

The recording server 170 stores the video data streams captured by the video cameras 110a, 110b, 110c. Video data is streamed from the recording server 170 to the client apparatus 120 depending on which live streams or recorded streams are selected by an operator to be viewed.

The client apparatus 120 is configured to communicate via a first network/bus 121 with the management server 130, the video processing apparatus 140, the thumbnail generating apparatus 150, the indexing server 160 and the recording server 170. The recording server 170 communicates with the cameras 110a, 110b, 110c via a second network/bus 122. Note that the invention is not limited to these particular networks/busses 121, 122 and that the aforementioned apparatuses and servers may be connected in a different way. For instance, the client apparatus 120, video processing apparatus 140, thumbnail generating apparatus 150, indexing server 160 and recording server 170 may be directly connected to the management server 130 which then acts as an interface between them. Alternatively, the management server 130, video processing apparatus 140, thumbnail generating apparatus 150, indexing server 160 and recording server 170 may be directly connected to the client apparatus 120 which then acts as an interface between them.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When a client apparatus 120 is connected to the system, or a user logs in, the management server 130 determines if the user is authorised to view video data. The management server 130 also initiates an initialisation or set-up procedure during which the management server 130 sends configuration data to the client apparatus 120. The configuration data defines the video cameras in the system, and which recording server (if there are multiple recording servers) each camera is connected to. The client apparatus 120 then stores the configuration data in a cache. The configuration data comprises the information necessary for the client apparatus 120 to identify video cameras and obtain data from video cameras and/or recording servers. Note that the invention is not limited to this particular example and that the configuration data may be stored in another apparatus or server of the video surveillance system.

Object detection/recognition can be applied to the video data by object recognition software. The object recognition software generates metadata (or content metadata) which is associated with the video stream and defines where in a frame an object has been detected. The content metadata may also define what type of object or activity has been detected e.g. person, car, dog, bicycle, alarm, movement. Other types of video analytics software can also generate content metadata, such as behaviour detection (e.g. loitering detection), license plate recognition, or facial recognition.

The object detection/recognition software, or any video analytics software that generates metadata, may be run on the client apparatus 120, or on an analytics server, or on the recording server 170, or may run on the video camera itself. It is not essential to the present invention where the metadata is generated. The metadata may be stored in the recording server with the video surveillance data and streamed to the client apparatus with or without its associated video data.

The video surveillance system of FIG. 1 is an example of a system in which the present invention can be implemented. However, other architectures are possible. For example, the system of FIG. 1 is an "on premises" system, but the present invention can also be implemented in a cloud-based system. In a cloud-based system, the video cameras stream data to the cloud, and at least the recording server 170 is in the cloud. Additionally, video analytics may be carried out in the cloud. The client apparatus requests the video data to be viewed by the user from the cloud.

The client apparatus 120 can for instance acquire the metadata from the indexing server 160 or from the recording server 170. Alternatively, the video data acquired by the client apparatus 120 may include the metadata generated by video analytics carried out elsewhere (e.g. at an analytics server, recording server or video camera).

There are also further alternative ways in which the invention could be implemented. For example, the search of video sequences could be carried out at the indexing server 160 or recording server 170, with the search query being sent from the client apparatus 120.

Figure 2:
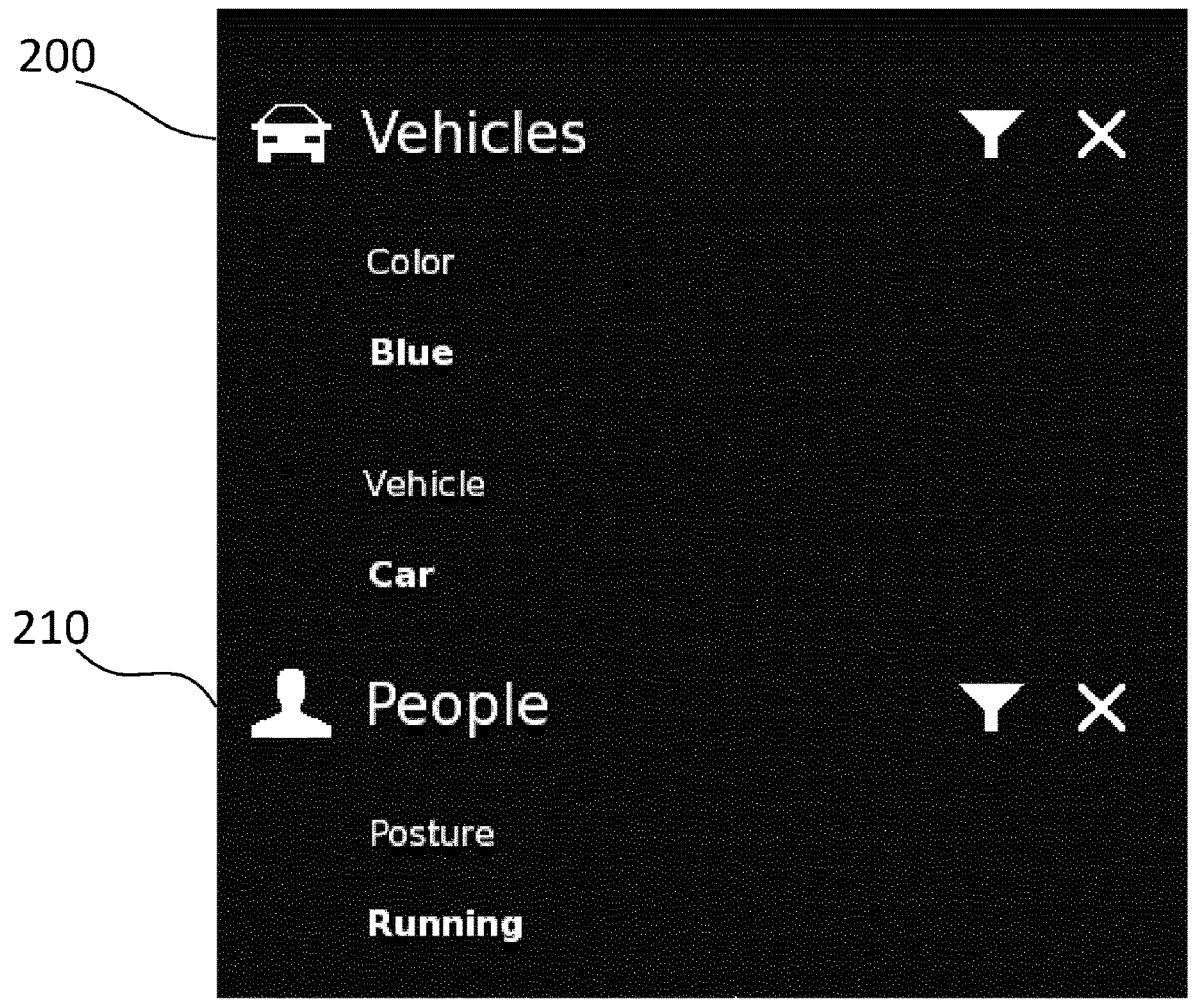
FIG. 2 illustrates a graphical user interface of two different search plugins.

In the present example, the recording server 170 runs analytics software without the need for a dedicated analytics server and the generated metadata is indexed in an organized manner on an indexing server 160 which can be queried by the user via the client apparatus 120, for instance via a graphical user interface (GUI) such as the one shown in FIG. 2.

The GUI of FIG. 2 comprises two search plugins (SPs) 200, 210, that can search for specific kinds of content in video sequences stored in the recording server 170 and return specific video sequences as search results matching different search queries. In the present example the first search plugin 200 can search for vehicles of a certain color and type, and the second search plugin 210 can search for people in a certain posture or making a certain movement. The present invention is however not limited to this example and can involve more than two search plugins. The invention can for instance also be carried out with one or more search plugins configured to search for metadata generated by analytics software and indexed in the indexing server 160.

The user may search different objects or activities of interest of the same type, or a combination thereof, provided the user has defined at least two different search criteria. For instance, the user may search for a blue car and a red car. Alternatively, the user may search for objects or activities of interest of different types, such as a blue car and an alarm whose sound has been recorded in a video sequence. The user may search for a combination of two objects of interest, two activities of interest or for one or more objects and one or more activities of interest. Examples of objects include (but are not limited to vehicles, license plates, people, animals, signs (such as an arrow) or geometrical forms. Examples of activities of interest include (but are not limited to) an alarm, a sound, an access by a person, vehicle or animal to a predetermined area (such as for instance an area surrounded or behind a fence) or an access to a place or resource controlled or monitored by an access control system (such as for instance a corridor behind a door controlled by a badge system).

Advantageously, the content metadata associated with a video sequence and related to an object or activity of interest in the video sequence may be augmented with additional metadata related to access control (such as for instance data related to the deactivation of an alarm in a building comprising the target area). One or more of the aforementioned plugins can then be configured to search for this additional metadata. This additional metadata can be generated by any appropriate piece of software known to a person skilled in the art.

Figure 3:
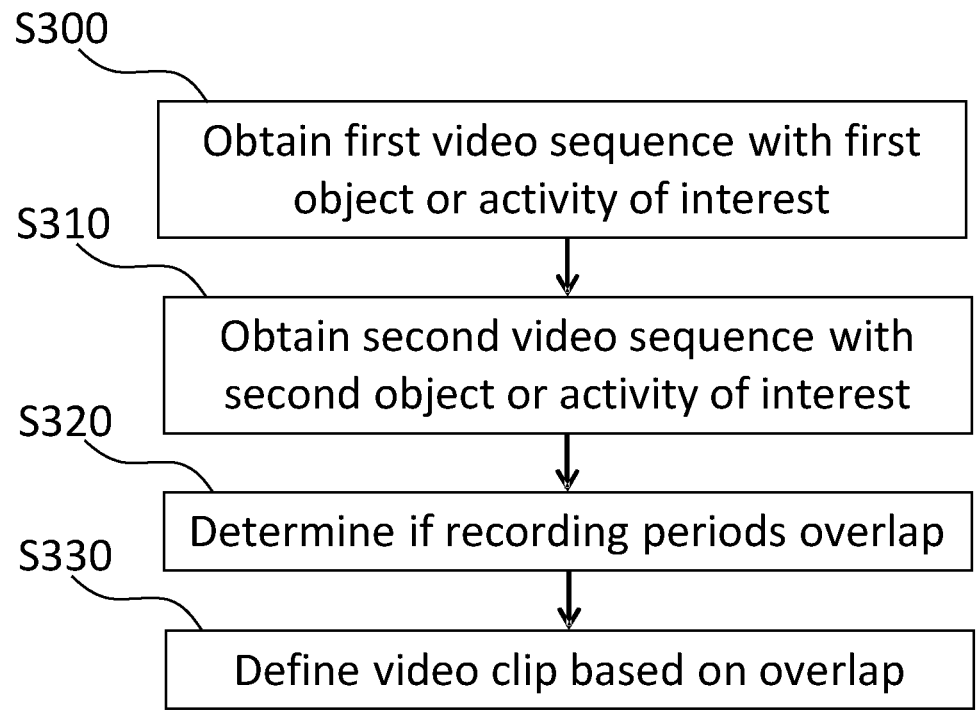
FIG. 3 is a flow chart of a computer-implemented method of video processing according to the present invention.

FIG. 3 illustrates a flow chart of a computer-implemented method of video processing according to the present invention, which essentially comprises four steps. In a first step S300, the computer will obtain a first video sequence of a target area comprising a first predetermined object or activity of interest and in a second step S310, the computer will obtain a second video sequence of the target area comprising a second predetermined object or activity of interest. Note that the steps S300 and S310 can also be carried out at the same time. The steps S300 and S310 can be carried out by a user entering one or more search criteria in two search plugins as stated above. In this way, the objects and/or activities of interest are predetermined by the user. In the next step S320, the computer will determine whether the recording periods of the first and second video sequences overlap in time. By "overlap in time", it is meant that the video sequences have been recorded at least in part at the same time. For instance, the first video sequence was recorded on the 1 Oct. 2020 between 4:00 and 4:15 pm upon detection and disappearance of a blue car (first predetermined object) in a target area and the second video sequence was recorded on the same day between 4:12 and 4:17 pm upon detection of a running person (second predetermined object) in the same target area. Since the first and second video sequences overlap, it is possible to define a first clip using frames of the first and/or second video sequence(s) from at least the time period of overlap which shows the two objects at the same time. In the above example, a clip can be defined using frames from the first and/or second video sequence(s) from the period between 4:12 and 4:15 pm, which is the time period of overlap. It is also possible to define a lengthier video clip comprising more frames from before and/or after the time period of overlap. In the above example, it is for instance possible to define a lengthier video clip comprising all frames from the first video sequence and all frames from the second video sequence to define a clip corresponding to a recording period between 4:00 and 4:17 pm. Alternatively, is it also possible to define one or more intermediate clips, for instance a clip comprising all frames from the first and second video sequences from the time period of overlap and all other frames from the first video sequence without any other frames from the second video sequence, i.e. a clip corresponding to a recording period between 4:00 and 4:15 pm; or a clip comprising all frames from the first and second video sequences from the time period of overlap and all other frames from the second video sequence without any other frames from the first video sequence, i.e. a clip corresponding to a recording period between 4:12 and 4:17 pm.

Preferably, the clip should comprise all frames from the first and second video sequences which overlap in time, i.e. all frames of the first and second video sequences from the time period of overlap between the first and second video sequences and all frames of the first and second video sequences existing outside the said time period of overlap (hereinafter referred to as an "OR" scenario) or all frames from the first and/or second video sequence(s) from the time period of overlap, which correspond to a sequence matching all the user's search research criteria for the longest possible period of time (hereinafter referred to as an "AND" scenario). The clips corresponding to the "OR" and "AND" scenarios will be the most meaningful to the user as they allow him/her to respectively see a clip showing the two objects and/or activities of interest for all the time they appeared in the target area, whether alone or together ("OR" scenario or "OR" result); or a clip showing only the two objects and/or activities of interest for all the time they were together in the same target area ("AND" scenario or "AND" result).

The clip corresponding to the "AND" scenario will for instance allow an operator to quickly check whether a runner tried to carjack a blue car, and the clip corresponding to the "OR" scenario will for instance allow the operator to more easily identify the runner after the blue car departed.

Obviously, clips corresponding to the "OR" and "AND" scenarios can be defined on an automated basis based on the user's search criteria.

Note that the system may be configured such that the user is only presented with clips corresponding to either one of the "OR" and "AND" results.

Moreover, it is possible to define a clip according to an "AND" scenario when it is possible to define a clip according to an "OR" scenario and vice versa. The clips according to the "OR" and "AND" scenarios may also be identical in a case where the recording periods of the overlapping search results from different search plugins are identical. However, as it will be explained in more details below, it may be advantageous not to display a clip according to the "AND" scenario when such a clip does not meet all the user's search criteria, e.g. when the user searched for three predetermined objects and/or activities of interest (or used three different search plugins) and search results obtained from only two search plugins overlap in time. In this way, the user is made aware that there can be no clip showing all his/her search criteria at the same time.

The first and second video sequences are recorded so as to cover the same target area. In this way, the frames from the first and second video sequences recorded during the time period of overlap are identical and it is possible to define a first clip using frames from either of the two video sequences from at least the time period of overlap, or frames from both video sequences. In the context of the present invention, frames of different video sequences are considered identical if they are copies of each other, without considering the metadata attached to them. This objective is even more easily achieved if the video sequences originate from the same video camera and correspond to a single field of view the video camera. This video camera can provide a field of view of more than 180 degree, for instance 360 degrees. However, the target area can also correspond to an area observed by a plurality of video cameras, for instance an area corresponding to a panoramic field of view obtained by combining the fields of view of the different video cameras.

The method may also involve obtaining any additional video sequences of the target area that has been recorded at least in part during a time period of overlap with the first and/or second video sequences and that comprises another object and/or activity of interest. In this way, it is possible to define at least one second clip corresponding to the time period of overlap between the first and additional video sequences, or to the second and additional video sequences. In a case where there is more than one such additional video sequence, the second clip can correspond to a time period of overlap between at least two of the obtained video sequences (among the first, second and additional video sequences), for instance between two additional video sequences. Note that the wording "first" or "second" clip does not preclude the existence of several first or second video clips according to the aforementioned "AND" and "OR" scenarios.

According to the invention, each of the first and second video clips originates from at least two video sequences, according to the aforementioned "AND" and "OR" scenarios. Note that a clip can originate from three or more video sequences, if the said three or more video sequences overlap during a time period.

The aforementioned method will now be described with the examples in FIGS. 4 to 17, showing the combination of search results according to the "AND" and "OR" scenarios.

In the present disclosure, the term "search result" or "individual search result" has to be understood as meaning a video sequence (or individual video sequence) such as the first, second or additional video sequences mentioned above, which is obtained from a "search plugin", unless specified otherwise. The term "search plugin" designates a means for searching any such video sequences based on at least one search criterion, such as for instance a search engine having a scroll-down menu with a list of predetermined objects or activities of interest that can be searched or a search field in which an operator can input text corresponding to the said at least one search criterion. The invention is not limited to the case where the search plugins are independent from each other from a software or coding perspective.

In these figures, the following key is used:

SPx-Ry: Input search result(s) 'y' found by search plugin 'x';

OR: Output result(s) in the "OR" scenario;

AND: Output result(s) in the "AND" scenario;

{z}: Comma separated list of input search results that make up this "OR" or "AND" result;

[ − − − − − − | − − − − − − − ]: The span and a trigger time of a search result on a "timeline" defined by start and end brackets. "-" indicates a frame of a video sequence. "|" indicates a trigger time. "!" will indicate a fabricated trigger time as further explained below.

The metadata associated with the video sequences can advantageously comprise one or more of the following elements:

"BeginTime": The begin or start time of a search result.

"EndTime": The end time of a search result.

"TriggerTime": The timestamp within the BeginTime and EndTime timespan for which an object and/or activity in the video sequence is visible or recognizable.

Note that the invention is not limited to the particular names given to the aforementioned definitions.

Advantageously, the trigger time corresponds to a time in a video sequence where the predetermined object and/or activity in the video sequence is the most visible or recognizable. In other words, a trigger time preferably corresponds to the "most important" frame in a video sequence, e.g. if the video sequence comprises a suspicious person walking by, then the trigger time could point to the frame where the person's face is most recognizable.

Figure 4:
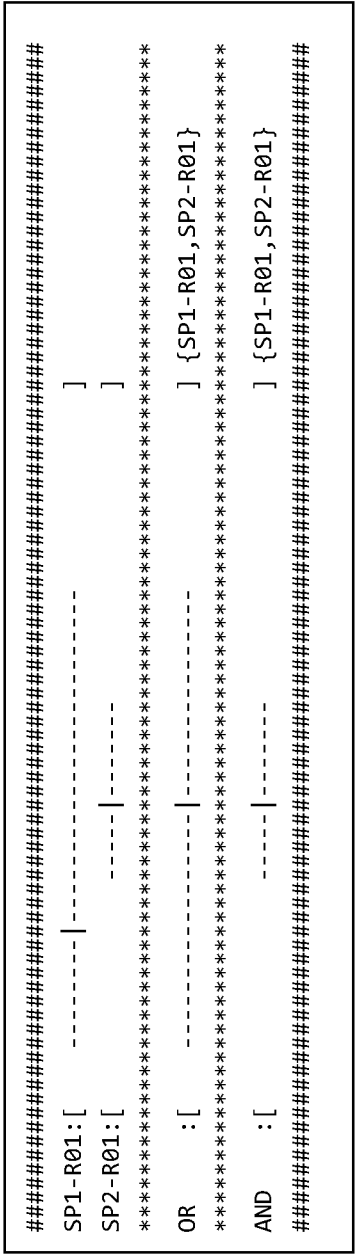

FIG. 4 illustrates an example wherein the first search plugin (SP1) and second search plugin (SP2) respectively return a first (SP1-R01) and second (SP2-R01) video sequence corresponding respectively to one of two search queries (or criteria) of an operator, as previously described. Here, it can be seen that the second video sequence was fully recorded while the first video sequence was being recorded. Accordingly, the recording periods of the first and second video sequences overlap in time and it is possible to define a first clip corresponding to the combination of both the first and second video sequences ("OR" scenario {SP1-R01, SP2-R01}) and/or a first clip comprising only frames from the time period of overlap between the first and second video sequences ("AND" scenario {SP1-R01, SP2-R01}). As previously explained, the operator may choose to see the clips from both the "AND" and "OR" scenarios or just one of them. Alternatively, the computer may be configured to display the results from both scenarios, or from only one scenario. In this example it can also be seen that the trigger time of the first video sequence (SP1-R01) does not fall within the time period of overlap between the first and second video sequences. However, the trigger time of the second video sequence (SP2-R01) falls within the time period of overlap. It is thus advantageous to use the frame from the first and/or second video sequence(s) which corresponds to this trigger time to generate a thumbnail comprising the first predetermined object or activity of interest from the first video sequence together with the second object or activity of interest from the second video sequence. This thumbnail is therefore representative of both objects or activities in the "AND" and "OR" results.

Figure 5:
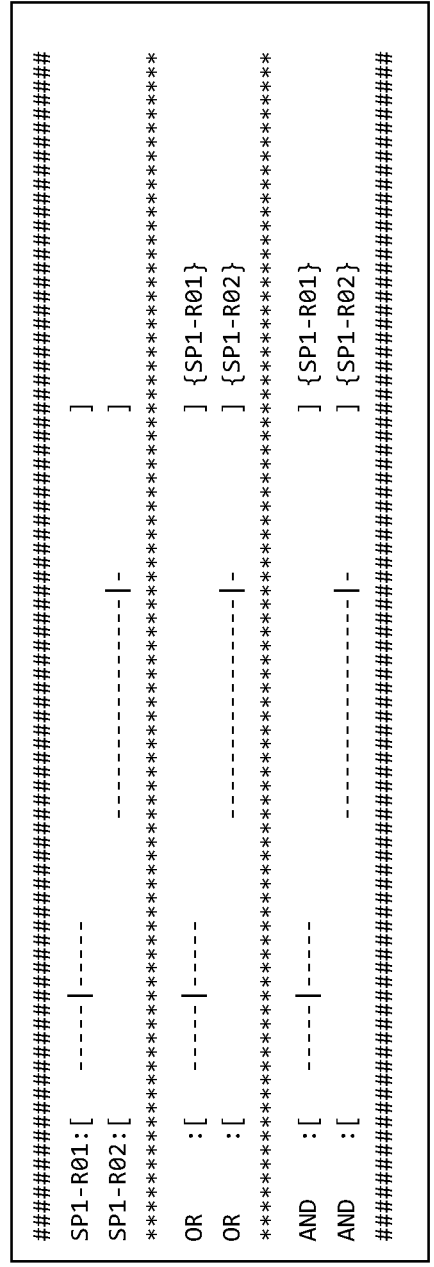

FIG. 5 illustrates an example wherein the recording periods of the first (SP1-R01) and second (SP1-R02) video sequences do not overlap, i.e. the first and second video sequences have not been recorded at the same time. Moreover, search results originating from the same search plugin are not used to define a clip since they contain the same predetermined object or activity of interest and not a second or additional predetermined object or activity of interest that the user is searching for. For these two reasons, it is thus not possible to define a clip according to the "AND" and "OR" scenarios, let alone a common thumbnail representative of such a clip. In this case, the search results can for instance be presented as four individual search results to the operator ("OR" results: {SP1-R01} and {SP1-R02}, and "AND" results: {SP1-R01} and {SP1-R02}) or alternatively not be presented at all.

FIG. 6 illustrates an example wherein the recording periods of the first (SP1-R01) and second (SP1-R02) video sequences overlap, but wherein the video sequences originate from the same search plugin (SP1) (such as in the example of FIG. 5). For instance, the first ({SP1-R01}) and second ({SP1-R02}) video sequences respectively comprise a blue car, i.e. the same predetermined object of interest as per the user's search request. For this reason, it is here again not possible to define any clips according to the "AND" and "OR" scenarios, let alone a common thumbnail representative of any such clips. In this case, the search results can also be presented as four individual search results to the operator ("OR" results: {SP1-R01} and {SP1-R02}, and "AND" results: {SP1-R01} and {SP1-R02}) or alternatively not be presented at all.

FIG. 7 illustrates an example similar to FIG. 5 but wherein the first (SP1-R01) and second (SP2-R01) video sequences originate from two different search plugins (SP1 and SP2). In such a case where the search results of different search plugins do not overlap in time, it may be advantageous not to present any search results to the operator for the "AND" scenario. In this way, the operator is made aware that it is not possible to define a clip comprising the two predetermined objects and/or activities of interest corresponding to his/her search queries because the two predetermined objects and/or activities of interest never appeared at the same time in the target area.

FIG. 8 illustrates an example wherein the search results from two different search plugins overlap in time, but wherein none of the first (SP1-R01) and second (SP2-R01) video sequences was fully recorded during the recording period of the other of the first and second video sequences. In this case, it is possible to define a clip comprising all the frames of the first and second video sequences ("OR" scenario {SP1-R01, SP2-R01}) and/or a clip comprising all the frames from the first and second video sequence(s) from the whole time period of overlap ("AND" scenario {SP1-R01, SP2-R01}). In this example, it can be seen that none of the trigger times of the first and second video sequences falls within the time period of overlap. In such a case where only two search results from different search plugins overlap with each other, it is proposed to use the frame from the first or second video sequence with the earliest trigger time to generate a thumbnail representative of the clip corresponding to the "OR" scenario, and the first frame of the clip corresponding to the "AND" scenario to generate a thumbnail representative of this clip. The first frame of the clip corresponding to the "AND" scenario used to generate the thumbnail can be defined as having a "fabricated trigger time", because the trigger time corresponding to this frame did not exist in the individual search results.

According to a non-illustrated example, when the search results from two different search plugins overlap in time, but where none of the first and second video sequences was fully recorded during the recording period of the other of the first and second video sequences, it is also possible to use a frame corresponding to the fabricated trigger time for the "AND" scenario to generate a thumbnail representative of the clip corresponding to the "OR" scenario. In this case, the thumbnail for the "OR" scenario will show both of the first and second predetermined object or activity of interest, as opposed to the example of FIG. 8 where only the first predetermined object or activity of interest is present in the thumbnail representative of the clip corresponding to the "OR" scenario.

Note that when a frame showing different objects and/or activities of interest is chosen as the thumbnail for a video sequence or clip, it may be advantageous to enclose the said objects and/or activities of interest within bounding boxes to facilitate identification by the operator.

FIG. 9 shows another example wherein the first search plugin (SP1) has returned a single search result (SP1-R01) and the second search plugin (SP2) has returned two search results (SP2-R01 and SP2-R02), and wherein only the first results from the two search plugins overlap in time (SP1-R01 and SP2-R01). In this case, it is possible to define a first clip comprising all the frames of the video sequences which overlap in time ("OR" scenario {{SP1-R01, SP2-R01}) and/or a first clip comprising only frames from the time period of overlap between the video sequences which overlap in time ("AND" scenario {SP1-R01, SP2-R01}). As previously stated, in such a case where only two search results from different search plugins overlap with each other, the earliest trigger time amongst the trigger times of the video sequences which overlap in time can be used to define the frame to be used to generate a thumbnail representative of any such clips corresponding to an "OR" scenario. The video sequences which do not overlap in time with any other video sequences can be presented as individual search results in the "OR" scenario (such as the sequence {SP2-R02} in the present example) or alternatively not be presented at all.

FIG. 10 shows an example involving more than two search plugins, and more particularly three search plugins.

Here, the first search plugin (SP1) has returned a single search result (SP1-R01), the second search plugin (SP2) has also returned a single search result (SP2-R01) and the third search plugin (SP3) two search results (SP3-R01 and SP3-R02). The two search results from the third plugin can be considered as "additional video sequences" as previously stated. In this example, the first search result (SP3-R01) from the third search plugin (SP3) overlaps with the first search result (SP1-R01) from the first search plugin (SP1) and the second search result (SP3-R02) from the third search plugin (SP3) overlaps with the first search result (SP2-R02) from the second search plugin (SP2). In this case, it is thus possible to define two first clips respectively comprising all the frames of the video sequences from different plugins which overlap in time ("OR" scenarios {SP1-R01, SP3-R01} and {SP2-R01, SP3-R02}). As previously stated, in such a case where only two search results from different search plugins overlap with each other, the earliest trigger time amongst the trigger times of the videos sequences which overlap in time can be used to define the frame to be used to generate a thumbnail representative of any such clips corresponding to an "OR" scenario. However, because there are no video sequences from all the different search plugins which simultaneously overlap in time, it may be advantageous not to present any search results to the operator for the "AND" scenario. Accordingly, the clips corresponding to "AND" scenarios {SP1-R01, SP3-R01} and {SP2-R01, SP3-R02} are preferably not presented to the user or removed/deleted. The word "NONE" can for instance be displayed in the list of "AND" results. In this way, the operator is made aware that it is not possible to define a clip comprising the three predetermined objects and/or activities of interest corresponding to his/her search queries because the three predetermined objects and/or activities of interest never appeared at the same time in the target area. Alternatively, no indication can be given to the user that it was not possible to define any such clips.

Figure 11:
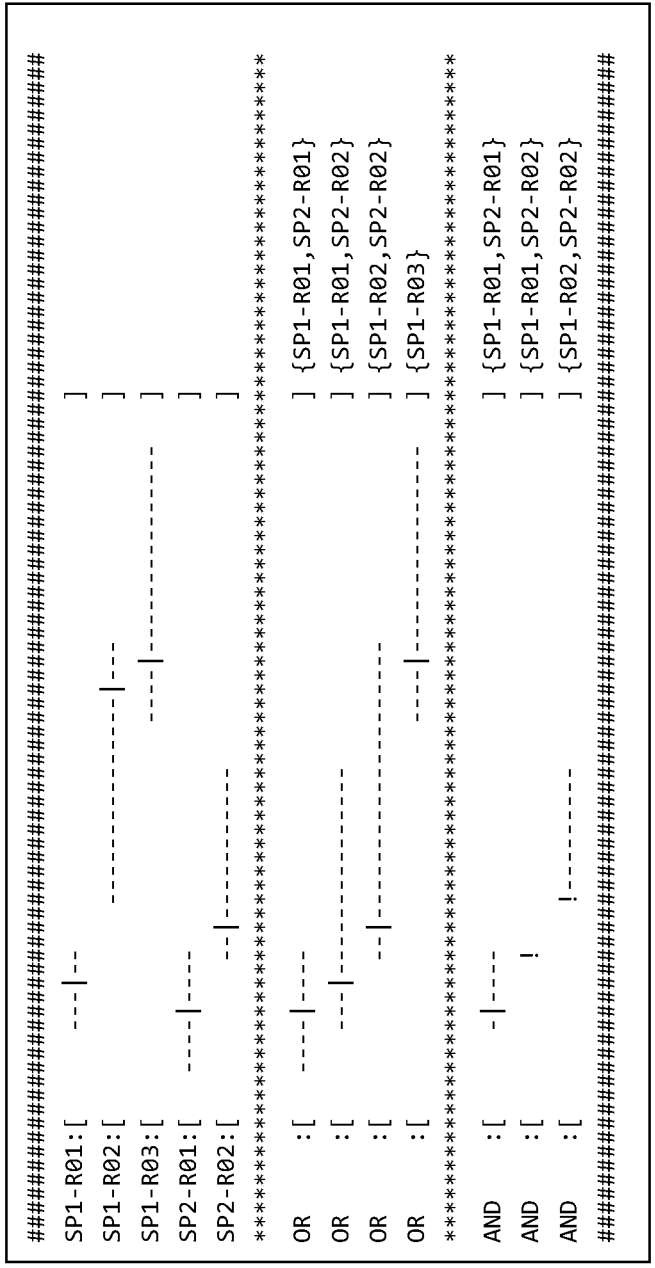

FIG. 11 shows an example involving two search plugins, wherein the first search plugin (SP1) has returned three search results (SP1-R01, SP1-R02, SP1-R03) and the second search plugin (SP2) has returned two search results (SP2-R01, SP2-R02). In this example, the first search result (SP1-R01) of the first search plugin (SP1) overlaps with the first (SP2-R01) and second (SP2-R02) search results of the second search plugin (SP2). Moreover, the second search result (SP1-R02) of the first search plugin (SP1) overlaps with the second search result (SP2-R02) of the second search plugin (SP2). As previously stated (such as for instance in the example of FIG. 6), search results originating from the same search plugin are not used to define a clip since they contain the same predetermined object or activity of interest and not a second or additional predetermined object or activity of interest that the user is searching for. In the present example, it is possible to define three clips comprising all the frames of the video sequences from different search plugins which overlap in time ("OR" scenarios {SP1-R01, SP2-R01}, {SP1-R01, SP2-R02} and {SP1-R02, SP2-R02}), two clips comprising only frames from a time period of overlap between the video sequences from different search plugins ("AND" scenarios {SP1-R01, SP2-R01} and {SP1-R02, SP2-R02}), and/or one clip comprising a single frame from a time period of overlap between the video sequences from different search plugins which overlap by only one frame ("AND" scenario {SP1-R01, SP2-R02}). The individual search results which do not overlap with other video sequences can be presented as such in the "OR" scenario, because these results meet at least one of the search criteria of the user's search request. Similarly to the example of FIG. 10, in such a case where only two search results from different search plugins overlap with each other, the earliest trigger time amongst the trigger times of the videos sequences from different search plugins which overlap in time can be used to define a frame to be used to generate a thumbnail representative of any such clips corresponding to an "OR" scenario. The earliest trigger time amongst the trigger times falling within the time period of overlap of the videos sequences from different search plugins which overlap in time can be used to define a frame to be used to generate a thumbnail representative of any such clips corresponding to an "AND" scenario (such as for the "AND" result {SP1-R01, SP2-R01}). Similarly to the example of FIG. 8, when no trigger time falls within the time period of overlap of video sequences from different search plugins which overlap in time with one another, it is possible to use the first frame of the corresponding clip defined in the "AND" scenario to generate a thumbnail representative of this clip. The first frame of each clip corresponding to the "AND" scenario used to generate the thumbnail can be defined as having a fabricated trigger time as previously explained with reference to FIG. 8 (see in this example, the "AND" scenarios {SP1-R01, SP2-R02} and {SP1-R02, SP2-R02}).

FIG. 12 shows an example involving three search plugins. Here, three video sequences from different search plugins overlap in time (search results SP1-R01, SP2-R01 and SP3-R02). It is thus possible to define a clip using all the frames of all the video sequences from different plugin which overlap in time ("OR" scenario ({SP1-R01, SP2-R01, SP3-R02}) and/or a clip using only the frames of the time period of overlap of all the video sequences from different plugin which overlap in time ("AND" scenario {SP1-R01, SP2-R01, SP3-R02}). In such a case where three or more search results from different search plugins overlap with one another, the earliest trigger time which overlaps with the most search results amongst the trigger times of the video sequences from different search plugins which overlap in time can be used to define a frame to be used to generate a thumbnail representative of any such clips corresponding to an "OR" scenario. Furthermore, similarly to the example of FIG. 10, the earliest trigger time amongst the trigger times falling within the time period of overlap of the videos sequences from different search plugins which overlap in time can be used to define the frame to be used to generate a thumbnail representative of any such clips corresponding to an "AND" scenario (here, the trigger time of SP1-R01 is the only trigger time falling within the time period of overlap of the search results SP1-R01, SP2-R01 and SP3-R02 and is thus used to define the frame to be used to generate the thumbnail representative of the clip corresponding to the "AND" scenario {SP1-R01, SP2-R01, SP3-R02}). In this example, the clip originating from the video sequences SP2-R01 and SP3-R01, the individual search result SP3-R03 and their thumbnails (in the "OR" scenarios) are obtained as described in the previous examples.

FIGS. 13 to 16 illustrate additional examples wherein at least one of the individual search results includes a preliminary sequence at the beginning of the video sequence and at least one closing sequence at the end of the said video sequence. The preliminary and closing sequences are individually be referred to as a padding sequence, i.e. a sequence in which the predetermined object or activity of interest of the video sequence does not necessarily appear and/or in which the video quality is lower than that of the remainder of the video sequence. Such a padding sequence can exist because the conditions of acquisition of the video sequence varied before they normalized, for instance because the target area is a dark room and a light was turned on, thus creating a padding sequence wherein the light has not yet reached its full brightness and wherein the quality of the recording of the video sequence is consequently low. The padding sequence may also exist because the video camera started recording upon activation by a sensor covering a wider area than the target area, and the predetermined object or activity of interest entered the target area after the start of the recording of the video sequence.

Whenever such a padding sequence exists, it is preferable not to take it into account for the purpose of determining whether the recording periods of the video sequences overlap in time with one another. However, it can be advantageous to include any such padding sequences in the clips defined according to the "AND" and "OR" scenarios.

In FIGS. 13 to 16, any padding sequence will be presented by a thin line and any non-padding sequence will be presented by a bold line. The individual frames of the video sequences are no longer shown for the sake of simplification.

The metadata associated with the video sequences can advantageously comprise one or more of the following elements:
  "BeginTime": The begin or start time of a search result not including any padding.
  "BeginTimeWithPadding": The begin or start time of a search result including padding.
  "EndTime": The end time of a search result not including any padding.
  "EndTimeWithPadding": The end time of a search result including padding.
  "TriggerTime": The timestamp within the BeginTime and EndTime timespan for which an object and/or activity in the video sequence is visible or recognizable.

Note that the invention is not limited to the particular names given to the aforementioned definitions.

As previously explained, the trigger time corresponds to a time in a video sequence where the predetermined object and/or activity in the video sequence is the most visible or recognizable.

FIG. 13 illustrates an example wherein the first search result (SP1-R01) of the first search plugin (SP1) includes two padding sequences, i.e. a preliminary and a closing sequence, while the first search result of the second search plugin does not include any padding sequences. In this example, it can be seen that the search results from these two plugins only overlap with each other because the closing sequence of the first search result (SP1-R01) of the first search plugin (SP1) overlaps with the first search result (SP2-R01) of the second search plugin (SP2). Since the padding sequences are not considered for determining whether the video sequences overlap, it is considered that the two search results do not overlap and it is thus not possible here to define a clip using frames of the first and/or second video sequence(s) according to the "AND" and "OR" scenarios. However, the individual search results can still be presented as two individual search results to the operator ({SP1-R01} and {SP2-R01}) under the "OR" scenario. Furthermore, as explained with reference to FIG. 10, the word "NONE" can for instance be displayed in the list of "AND" results because there are no clips corresponding to an "AND" scenario.

FIG. 14 illustrate an example similar to the one of FIG. 13, but wherein the first search result (SP1-R01) of the first search plugin (SP1) overlaps with the first search result (SP2-R01) of the second search plugin (SP2) without taking the padding sequences of the first search result (SP1-R01) of the first search plugin (SP1) into account. In this case, it is possible to define a clip comprising all the frames of the first and second video sequences ("OR" scenario {SP1-R01, SP2-R01}) and/or a clip comprising all the frames from the first and second video sequence(s) from the whole time period of overlap ("AND" scenario {SP1-R01, SP2-R01}). Although the padding sequences are not considered for determining whether the video sequences overlap, the frames of the padding sequences from video sequences from different search plugins which overlap in time can still be included into the clips to be defined under the "OR" scenarios. However, frames of a padding sequence from a video sequence which overlaps in time with another video sequence from another search plugin will only be included into a clip to be defined under the "AND" scenario to the extent that the padding sequence also overlaps with a padding or non-padding sequence of the said other video sequence. Preferably, the frames of any padding sequence which overlaps with a non-padding sequence from a different search plugin will be presented as frames from a non-padding sequence in the "OR" scenario(s) (such as for instance the closing sequence of the search result SP1-R01 which is presented as a non-padding sequence in the "OR" scenario {SP1-R01, SP2-R01}). On the other hand, the frames of any padding sequence which overlaps with a non-padding sequence from a different search plugin will preferably be presented as frames from a padding sequence in the "AND" scenario(s) (such as for instance the closing sequence of the search result SP1-R01 which is presented as a padding sequence in the "AND" scenario {SP1-R01, SP2-R01}). The thumbnails for the clips defined according to the "AND" and "OR" scenarios are defined in a similar way to the aforementioned examples.

Figure 15:
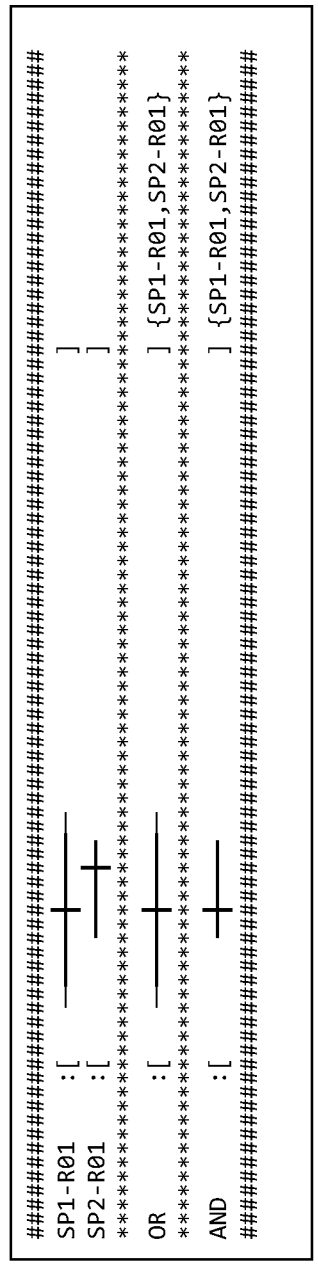

FIG. 15 illustrates a similar example to the example of FIG. 14, with the difference that the first search result (SP2-R01) of the second search plugin (SP2) was entirely recorded while the first result (SP1-R01) of the first search plugin (SP1) was recorded and with the difference that the closing sequence of the first search result of the first search plugin does not overlap with the first search result of the second search plugin. According to the rules mentioned with respect to FIG. 14, the frames of the padding sequences of the first search result of the first search plugin are included into the clip comprising all the frames of the overlapping video sequences ("OR" scenario {SP1-R01, SP2-R01}) and preferably presented as frames from a padding sequence because they do not overlap with the first search result of the second search plugin. In addition, the frames of the padding sequences of the first search result of the first search plugin are not included into the clip comprising all the frames from the video sequences from the whole period of overlap in time ("AND" scenario {SP1-R01, SP2-R01}) because the padding sequences of the first search result of the first search plugin do not overlap in time with the first search result of the second search plugin. The thumbnails for the clips defined according to the "AND" and "OR" scenarios are here again defined in a similar way to the aforementioned examples.

Figure 16:
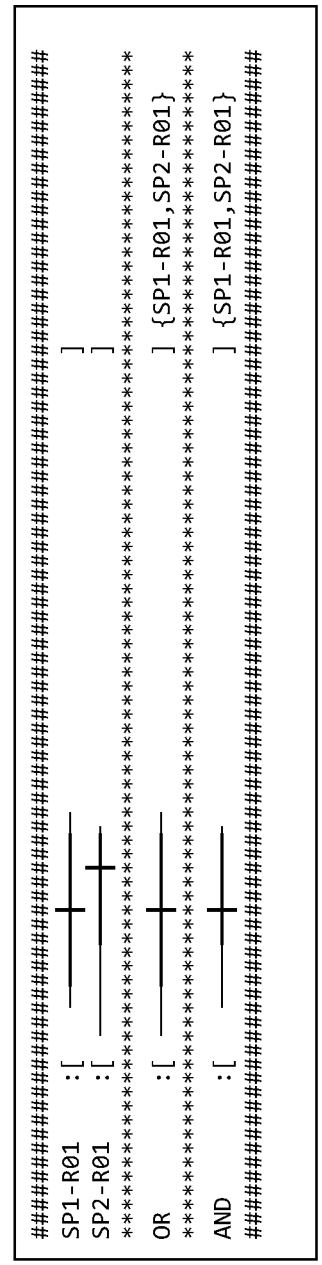

FIG. 16 illustrates a final example of the method of video processing based on the example shown in figure but with the difference that the first search result (SP2-R01) from the second search plugin (SP2) also includes preliminary and closing padding sequences.

In this case, it can be seen that the preliminary sequence of the first search result of the second search plugin overlaps in part with the preliminary sequence of the first search result of the first search plugin and in part with a non-padding part of the first search result of the first search plugin. As explained above with respect to FIG. 14, the frames of any padding sequence which overlaps with a non-padding sequence from a different search plugin will preferably be presented as frames from a non-padding sequence in the "OR" scenario(s) and the frames of any padding sequence which overlaps with another padding sequence from a different search plugin will preferably be presented as frames from a padding sequence in the "OR" scenario(s). On the other hand, the frames of any padding sequence which overlaps with a non-padding sequence from a different search plugin will preferably be presented as frames from a padding sequence in the "AND" scenario(s), regardless of whether the frames of the padding sequence overlap with a padding or non-padding sequence.

Figure 17:
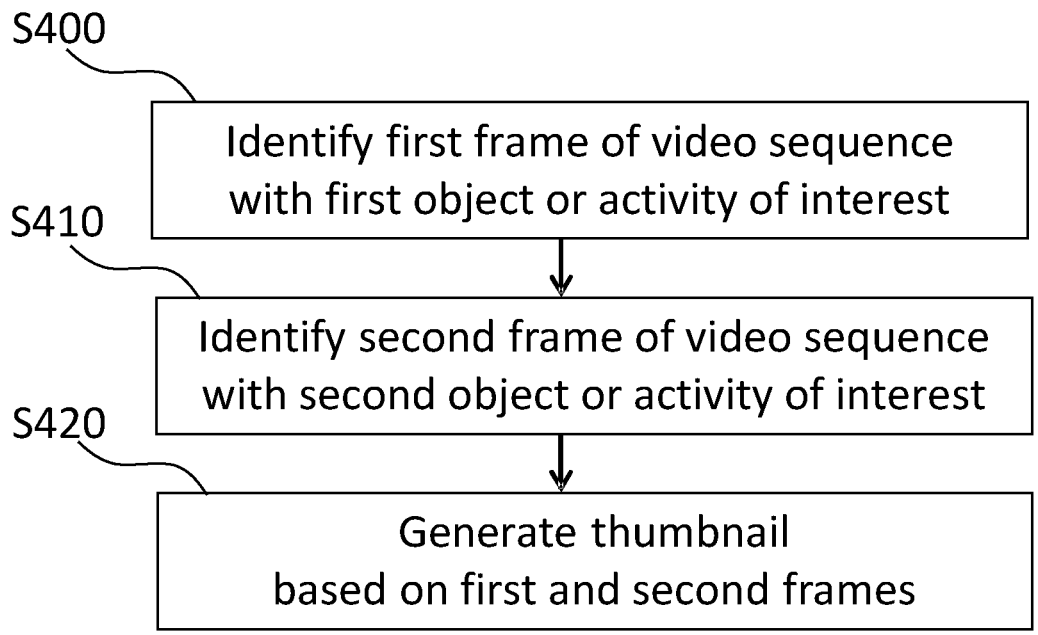
FIG. 17 is a flow chart of a computer-implemented method of generating a thumbnail from a video sequence according to the present invention.

FIG. 17 illustrates a flow chart of a computer-implemented method of generating a thumbnail from a video sequence according to the present invention, which essentially comprises three steps.

In a first step S400, the computer will identify a first frame in a video sequence comprising a first object or activity of interest and in a second step S410, the computer will identify a second frame in the video sequence comprising a second object or activity of interest. Alternatively, the steps S400 and S410 can be carried out at the same time. The first and second frames are preferably identified in a clip originating from two video sequences as per the aforementioned computer-implemented method of video processing. In the next step S420, the computer will generate a thumbnail using at least part of the first frame and at least part of the second frame of the video sequence or clip, the thumbnail including the first and second object or activity.

The method can for instance comprise a step wherein the first and second frames of the video sequence are extracted or copied from the video sequence for generating the thumbnail. In other words, the frames can be copied from the video sequence or clip prior to being used for generating the thumbnail.

Figure 18:
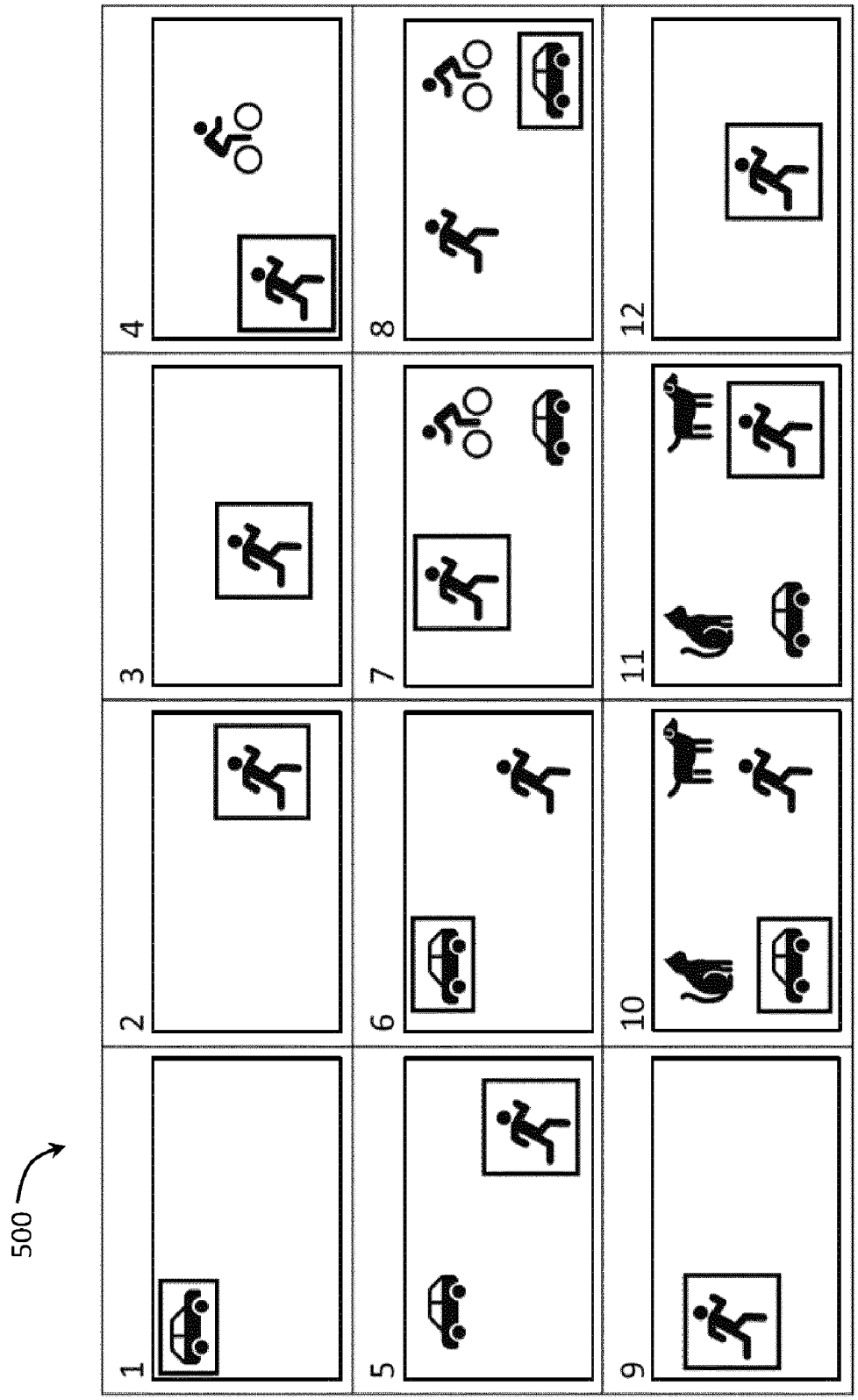
FIGS. 18 to 22(b) illustrate different thumbnails that can be returned by the computer-implemented method of generating a thumbnail from a video sequence according to the present invention.

FIG. 18 illustrates thumbnails that would normally be presented to an operator searching for a runner and a car. In this example, each thumbnail presented in the grid view of thumbnails 500 corresponds to an individual search result corresponding to at least one of the search criteria of the operator. The car results 1, 6, 8 and 10 originate from the first search plugin and the runner results 2, 3, 4, 5, 7, 9, 11 and 12 originate from the second search plugin. The objects and/or activities of interest searched by the user are preferably displayed inside a bounding box on each thumbnail so as to facilitate their identification by the operator. In this and the following examples, the thumbnails are clickable so as to open the video sequences to which the thumbnails correspond. Note that the invention is not limited to the aforementioned grid view presentation. The numbers above the thumbnails are also not an essential feature of the invention.

However, as is apparent from this example, simply showing all the results from the two search plugins or criteria individually can make them quite difficult to process for the operator. There will often be many results and the operator cannot easily determine if the cars and the runners shown in the result thumbnails are in reasonable time-wise proximity to each other. The thumbnails shown are based on the trigger times that the search plugins independently chose for their search results, without knowing anything about the other search plugin(s).

According to the aforementioned computer-implemented method of video processing, it is possible to define at least one clip comprising both of the first and second object or activity of interest that the operator is searching for; and according to the aforementioned computer-implemented method of generating a thumbnail from a video sequence, it is further possible to define a thumbnail including the first and second object or activity of interest.

Figure 19:
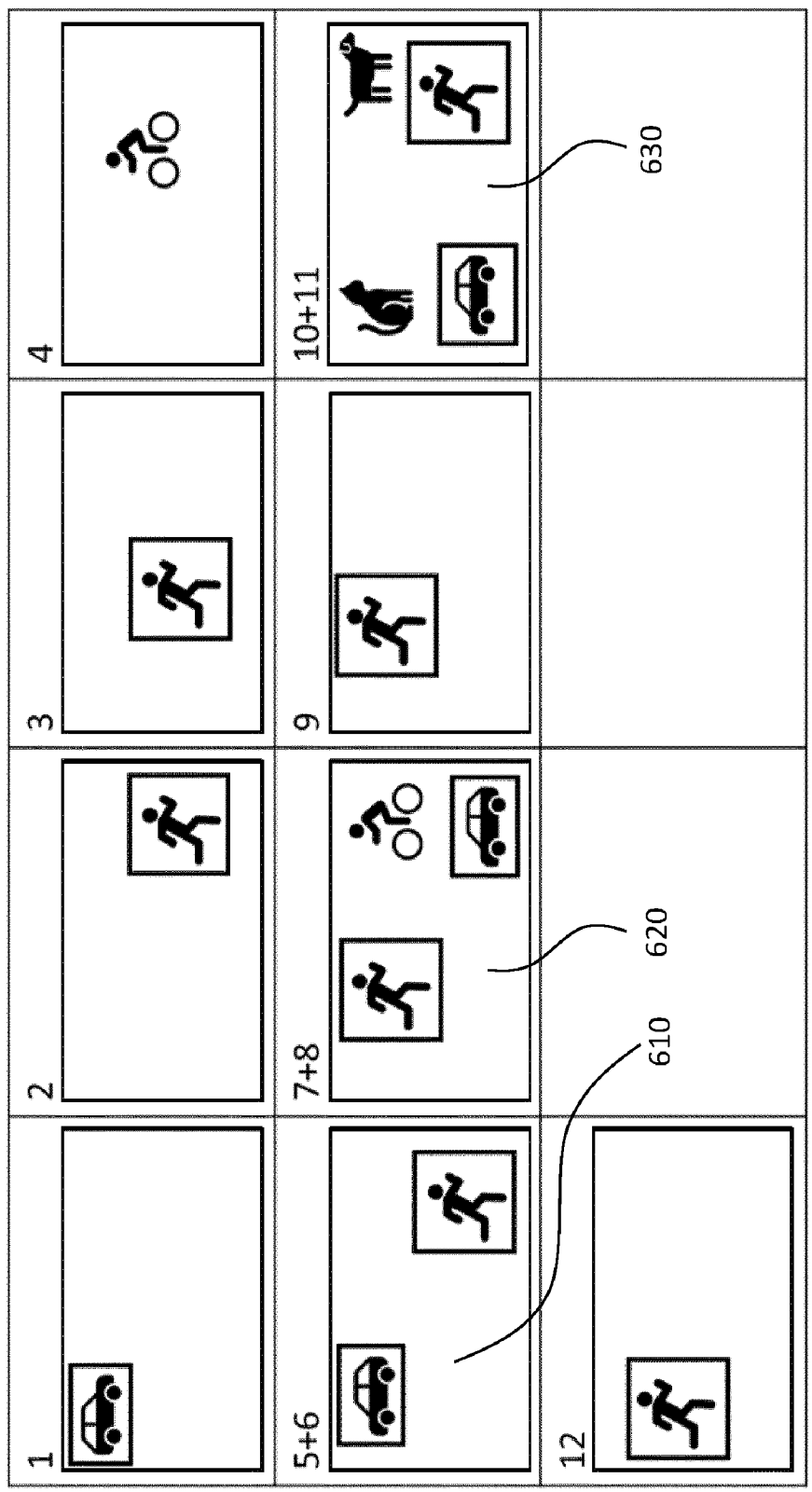

FIG. 19 illustrates an example wherein both methods of video processing and of generating a thumbnail are used. In this example, we can observe that the results 5+6, 7+8 and 10+11 have been merged into combined video sequences or clips and the operator now knows that in these clips the car and runner appeared at the same time.

The operator can choose to remove individual search results which are not a clip matching all the user's search criteria, e.g. when the user searched for three predetermined objects and/or activities of interest (or used three different search plugins) but when search results obtained from only two search plugins overlap in time. In this way, the user is made aware that there can be no clip showing all his/her search criteria at the same time.

Figure 20:
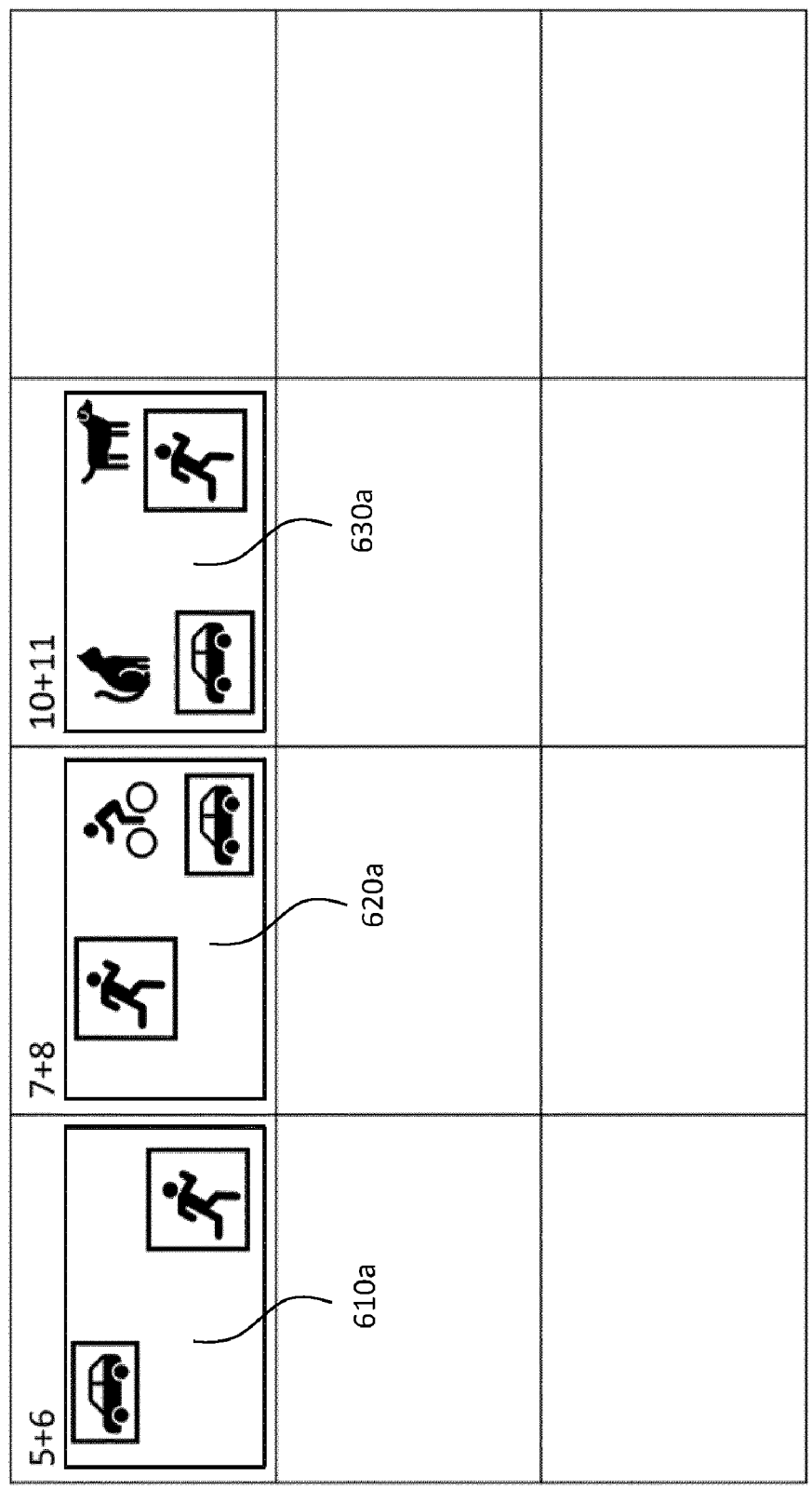

Applying this to the example of FIG. 18, the operator now only sees the three combined video sequences where a car and a runner appeared at the same time, giving the thumbnails 610a, 620a, 630a, shown in FIG. 20. This gives a much better overview of the relevant video data, but the operator still needs to examine the three clips to identity which one contains the exact car and person that are being searched for.

Figure 21:
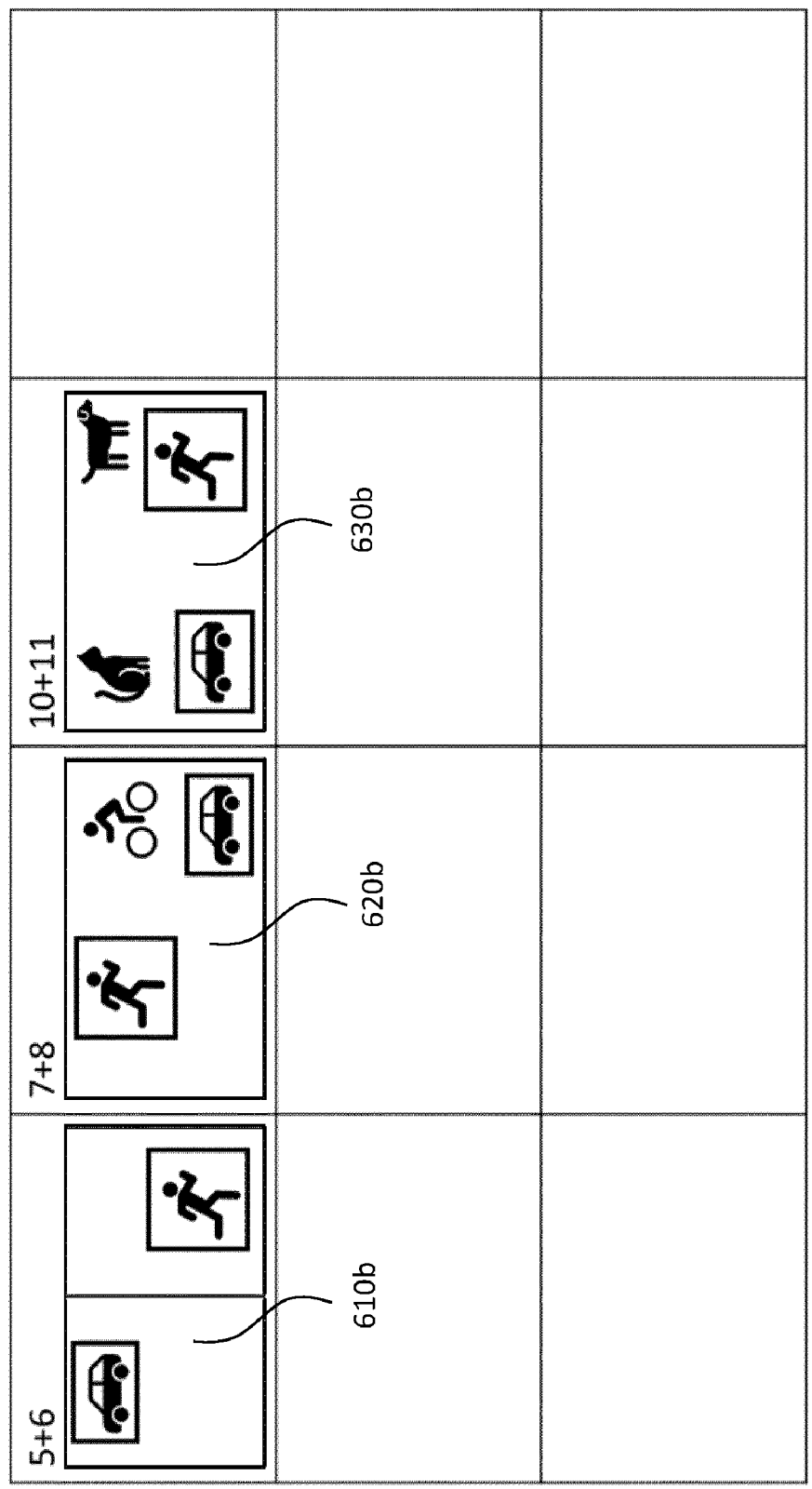

FIG. 21 shows three additional examples of thumbnails 610b, 620b, 630b that can be obtained according to the method of generating a thumbnail according to the present invention. According to an example of thumbnail 610b corresponding to the search results 5+6, the computer takes part of the frames matching the trigger times for the two individual video sequences and generates a single combined thumbnail by simply stitching the individual thumbnails together into one. A "stitching border" is selected by the computer based on the position of the objects and/or activities of interest related to the individual search results. According to an example of thumbnail 620b corresponding to the search results 7+8, the computer proceeds as in the first example but does not add any border to separate the first and second frames or parts thereof. According to an example of thumbnail 630b corresponding to the search results 10+11, the computer selects the frame matching the trigger time for one of the individual video sequences and use it as the base thumbnail. From the frame matching the trigger time of the other individual video sequence the computer extracts the related object or activity of interest and overlaps it with the said base thumbnail to represent the combined video sequence or clip.

Figure 22A:
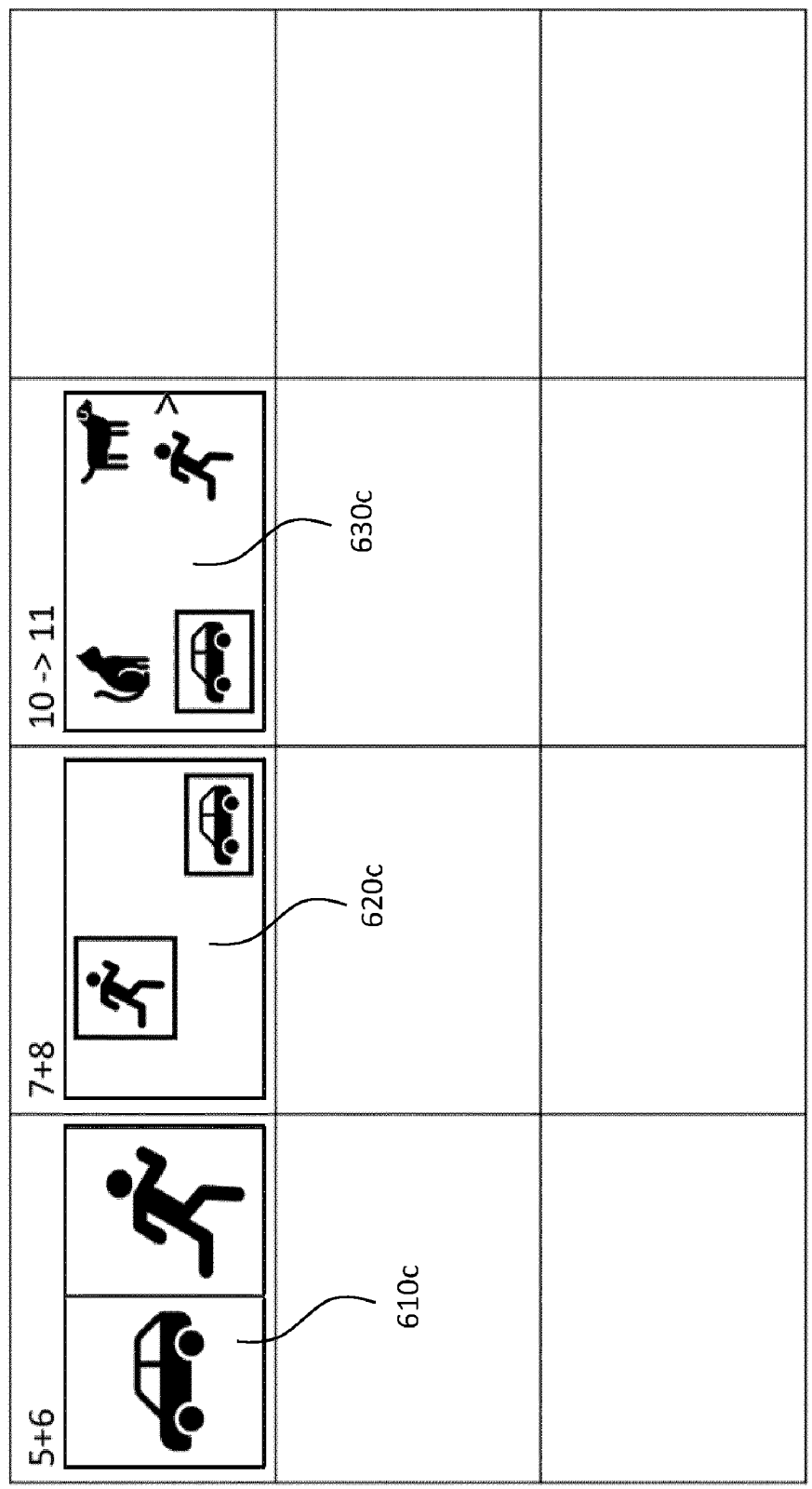
Figure 22B:
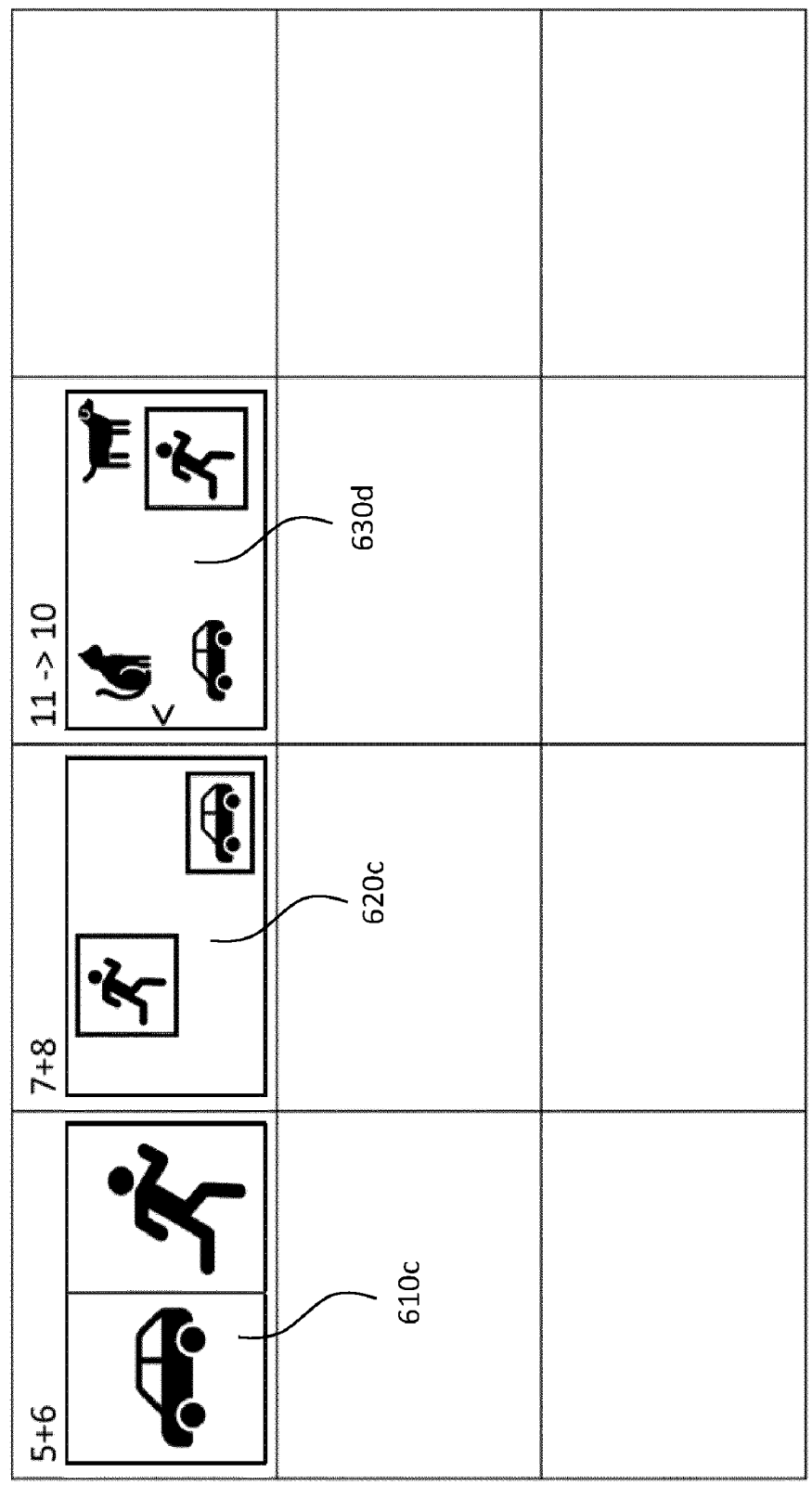

FIGS. 22(a) and 22(b) illustrate additional examples of thumbnails that can be obtained according to the method of generating a thumbnail according to the present invention. According to an example of thumbnail 610c corresponding to the search results 5+6, from the frames matching the trigger times of the two individual search results the computer extracts the related objects and/or activities of interest, enlarges them and generates a thumbnail that now represents the combined video sequence or clip. The thumbnail preferably includes a border as previously described with reference to FIG. 21. According to an example of thumbnail 620c corresponding to the search results 7+8, the computer uses a predetermined background (such as a neutral reference frame) as the base thumbnail. The neutral frame may advantageously be a picture of the target area captured without the first and second object or activity of interest, or without no object or activity in it.

From the frames matching the trigger times of the two individual search results the computer extracts the related objects and overlaps them with the predetermined background that now represents the combined video sequence or clip. According to an example of thumbnail 630c, 630d, corresponding to the search results 10+11, the computer takes the frames matching the trigger times for the two individual video sequences and shows them as the thumbnail one by one in a "pagination control". Switching between the thumbnails can be done is various ways, e.g. manually by clicking a button allowing an operator to switch between the two frames of the thumbnail. Alternatively, the computer may display the frames matching the trigger times for the two individual video sequences and shows them one by one for a predetermined time as the thumbnail.

Although the examples shown in FIGS. 19 to 22(b) relate to clips comprising only two objects or activities of interest, the present invention also covers the case where three or more objects are searched for (as with the aforementioned examples related to the "additional video sequences"), such that the corresponding generated thumbnails will therefore comprise three or more objects or activities.

While the present invention has been described with reference to various examples, it is to be understood that the invention is not limited to the disclosed examples. The present invention can be implemented in various forms without departing from the principal features of the present invention as defined by the claims.

The following numbered statements provide additional information on the invention. The claims are provided after the numbered statements.

Statement 1. A computer-implemented method of video processing, comprising:
obtaining a first video sequence of a target area comprising a first predetermined object or activity of interest;
obtaining a second video sequence of the target area comprising a second predetermined object or activity of interest;
determining whether a recording period of the first video sequence and a recording period of the second video sequence overlap for a time period; and
in a case where the recording periods of the first and second video sequences overlap for a time period, defining at least one first video clip using frames of the first and/or second video sequence(s) from at least the time period of overlap.

Statement 2. The method as described in statement 1, further comprising:
obtaining at least one additional video sequence of the target area, each additional video sequence comprising a predetermined object or activity of interest in the target area and having a recording period;
determining whether the recording period of each additional video sequence overlaps with the recording periods of any other additional video sequences and/or with the recording periods of the first and/or second video sequence(s) for a time period;
in a case where the recording period of an additional video sequence and a recording period of any other video sequence among the first, second and other additional video sequences overlap for a time period, defining at least a second video clip using frames of the additional and/or other video sequence(s) from the time period of overlap.

Statement 3. The method as described in any one of the preceding statements, wherein all the said video sequences are obtained by searching video data stored on a recording server, wherein the recording server has video data from a plurality of video cameras stored thereon.

Statement 4. The method as described in any one of the preceding statements, further comprising generating metadata relating to all the said predetermined objects or activities of interest.

Statement 5. The method as described in any one of the preceding statements, wherein all the said video sequences originate from a single video camera.

Statement 6. The method as described in any one of the preceding statements, wherein the target area corresponds to a field of view of a single video camera.

Statement 7. The method as described in any one of the preceding statements, wherein all the said predetermined objects are types of objects chosen from a group of objects consisting of vehicles, license plates, people and animals.

Statement 8. The method as described in the preceding statement, wherein all the said predetermined objects correspond to different types of objects in the said group of objects.

Statement 9. The method as described in the preceding statement in combination with statement 3, wherein searching video data is done by a user entering one or more search criteria in at least two search plugins.

Statement 10. The method as described in the preceding statement in combination with statement 7 or 8, wherein each search plugin is a search engine configured to identify in all the said video sequences one object in the said group of objects or one activity of interest.

Statement 11. The method as described in the preceding statement, wherein all the said video sequences are obtained as search results of at least two queries from the user, and wherein each query relates to a different predetermined object or activity of interest among the said predetermined objects or activities of interest.

Statement 12. The method as described in any one of the preceding statements, wherein each of the said video sequences comprises content metadata relating to a predetermined object or activity of interest of the video sequence.

Statement 13. The method as described in the preceding statement in combination with statement 3, wherein the content metadata is generated by an analytics plugin on the recording server.

Statement 14. The method as described in the preceding statement, wherein obtaining all the said video sequences is done by searching the content metadata of different video sequences.

Statement 15. The method as described in the preceding statement, wherein at least one video sequence of all the said video sequences comprises at least one preliminary sequence at the beginning of the video sequence and/or at least one closing sequence at the end of the video sequence, the preliminary and/or closing video sequence(s) being individually referred to as a padding sequence in which the predetermined object or activity of interest of the video sequence does not appear and/or in which the video quality is lower than that of the remainder of the video sequence.

Statement 16. The method as described in statement 15, wherein the at least one padding sequence is not taken into account for the purpose of determining whether all the said video sequences overlap for the said time period with one another.

Statement 17. The method as described in any one of the preceding statements, wherein at least the first video clip comprises all the frames of the first or second video sequence from the time period of overlap.

Statement 18. The method as described in the preceding statement, wherein at least the first video clip further comprises all the frames of the first and/or second video sequence(s) from before and after the time period of overlap.

Statement 19. The method as described in the preceding statement in combination with statement 2 and 9 or 2 and further comprising cancelling the defining of the first and/or second video clip(s) in a case where three or more search plugins are used when querying the at least one database and when the first and/or second video clip(s) do not include results from all of the three or more search plugins used.

Statement 20. The method as described in any one of statements 1 to 19, further comprising displaying the said first video clip or a thumbnail of the first video clip to a user without displaying the first and second video sequences from which the said first video clip has been defined.

Statement 21. The method as described in any one of statements 1 to 19, further comprising:
identifying a first frame of the first video clip comprising the first predetermined object or activity of interest;
identifying a second frame of the first video clip comprising the second predetermined object or activity of interest; and
generating a thumbnail using at least part of the first frame and at least part of the second frame of the first video clip, the thumbnail including the first and second predetermined object or activity.

Statement 22. The method as described in the preceding statement, comprising extracting the first and second frames from the first video clip for generating the thumbnail.

Statement 23. The method as described in any one of statements 21 and 22, further comprising generating the thumbnail by: extracting the first or second predetermined object or activity from one frame of the two frames; and
overlapping the extracted first or second predetermined object or activity with the other of the two frames.

Statement 24. The method as described in statement 21 or 22, further comprising generating the thumbnail by:
extracting the first and second predetermined object or activity from the two frames; and
overlapping the extracted first and second predetermined object or activity with a predetermined background.

Statement 25. The method as described in the preceding statement, wherein the first and second predetermined object or activity are enlarged on the predetermined background.

Statement 26. The method as described in statement 21 or 22, further comprising displaying as the thumbnail each of said two frames one after the other.

Statement 27. The method as described in the preceding statement, wherein each frame of the thumbnail is displayed in turn for a predetermined time.

Statement 28. The method as described in statement 26, wherein the thumbnail comprises at least one clickable button allowing a user to switch between the two frames of the thumbnail.

Statement 29. The method as described in any one of statements 21 to 28, wherein the first and second predetermined object or activity are each contained inside a bounding box on the thumbnail.

Statement 30. The method as described in any one of statements 21 to 29, wherein the first and/or second predetermined object(s) are types of objects chosen from the group of objects consisting of vehicles, license plates, people and animals.

Statement 31. The method as described in the preceding statement, wherein the first and/or second predetermined object(s) correspond to different types of objects in the said group of objects.

Statement 32. The method as described in any one of statements 21 to 31, wherein the first video clip comprises metadata defining a start time and an end time of the first video clip.

Statement 33. The method as described in any one of statements 21 to 32, further comprising displaying the said one thumbnail.

Statement 34. The method as described in any one of statements 21 to 33, comprising searching the first video clip based on object or facial recognition, motion, or bounding boxes existing in the first video clip, or searching content metadata associated with the first video clip so as to identify the first and second predetermined object or activity of interest prior to identifying the said first and second frames.

Statement 35. The method as described in the preceding statement, wherein searching content metadata comprises sending a search request to an indexing server storing the content metadata and receiving search results from the indexing server indicating video frames which match the search criteria.

Statement 36. The method as described in the preceding statement, wherein the content metadata comprises trigger times corresponding to the frames including the first and second predetermined object or activity.

Statement 37. The method as described in the preceding statement, wherein the said trigger times correspond to frames of the first video clip where the first and second predetermined object or activity are the most visible or recognizable in the first video clip.

Statement 38. The method as described in any one of statements 21 to 37, wherein the thumbnail comprises an internal border separating one frame or part thereof from the other of the two frames or part thereof, the border being positioned not to conceal the first and second predetermined object or activity.

Statement 39. A computer program which, when run on a computer, causes the computer to carry out the method as described in any one of the preceding statements.

Statement 40. A video processing apparatus, comprising at least one processor configured to:
receive from a user a first query related to a first predetermined object or activity of interest and a second query related to a second predetermined object or activity of interest;
obtain from at least one database a first video sequence of a target area comprising the first predetermined object or activity of interest and a second video sequence of the target area comprising the second predetermined object or activity of interest;
determine whether a recording period of the first video sequence and a recording period of the second video sequence overlap for a time period;
in a case where the recording periods of the first and second video sequences overlap for a time period, define at least one first video clip using frames of the first and/or second video sequence(s) from the period of overlap.

Statement 41. The video processing apparatus as described in the preceding statement, wherein the said at least one processor is further configured to:
identify a first frame of the first video clip comprising the first predetermined object or activity of interest;
identify a second frame of the first video clip comprising the second predetermined object or activity of interest; and
generate a thumbnail using at least part of the first frame and at least part of the second frame of the first video clip, the thumbnail including the first and second predetermined object or activity.

Statement 42. A video surveillance system comprising a video processing apparatus as described in the preceding statement and a client apparatus comprising a display, the client apparatus comprising at least one processor configured to display at least the said first video clip or the thumbnail of the said first video clip.

Statement 43. A video surveillance system as described in the preceding statement wherein the client apparatus is further configured to display the said first video clip or the thumbnail of the said first video clip without displaying the first and second video sequences from which the said first video clip has been defined.

Statement 44. A video surveillance system as described in statement 41 or 42, further comprising a video camera and a recording server, wherein the recording server comprises a processor configured to:
cause the recording of video sequences captured from the video camera in a database in a storing medium;
receive search queries from the client apparatus;
extract video sequences from the database according to the search queries; and
define and transmit the said one first video clip to the client apparatus.

The invention claimed is:

1. A computer-implemented method of video processing, comprising:
receiving first and second search queries from a user and an instruction to generate search results matching any or all of the first and second search queries;
obtaining a first video sequence of a target area comprising a first predetermined object corresponding to the first search query;
obtaining a second video sequence of the target area comprising a second predetermined object corresponding to the second search query;
upon receiving the instruction, determining whether the said first and second video sequences originate from a single video camera and whether a recording period of the first video sequence and a recording period of the second video sequence overlap for a time period; and
in a case where the said first and second video sequences originate from a single video camera and the recording periods of the first and second video sequences overlap for a time period, defining at least one first video clip using frames of the first and/or second video sequence(s) from at least the time period of overlap, and presenting the first video clip to the user as a search result; and
in a case where the user chooses to obtain search results matching any of the first and second search queries and the recording periods of the first and second video sequences do not overlap for any time period, presenting the user with the first and second video sequences as different search results.

2. The method according to claim 1, further comprising:
obtaining at least one additional video sequence of the target area, each additional video sequence comprising a predetermined object in the target area and having a recording period;
determining whether the recording period of each additional video sequence overlaps with the recording periods of any other additional video sequences and/or with the recording periods of the first and/or second video sequence(s) for a time period;

in a case where the recording period of an additional video sequence and a recording period of any other video sequence among the first, second and other additional video sequences overlap for a time period, defining at least a second video clip using frames of the additional and/or other video sequence(s) from the time period of overlap.

3. The method according to claim 1, wherein the target area corresponds to a field of view of the said single video camera.

4. The method according to claim 1, wherein all the said predetermined objects are types of objects chosen from a group of objects consisting of vehicles, license plates, people and animals.

5. The method according to claim 1, wherein at least the first video clip comprises all the frames of the first or second video sequence from the time period of overlap.

6. The method according to claim 5, wherein at least the first video clip further comprises all the frames of the first and/or second video sequence(s) from before and after the time period of overlap.

7. The method according to claim 1, further comprising:
identifying a first frame of the first video clip comprising the first predetermined object;
identifying a second frame of the first video clip comprising the second predetermined object; and
generating a thumbnail using at least part of the first frame and at least part of the second frame of the first video clip, the thumbnail including the first and second predetermined object.

8. The method according to claim 7, further comprising generating the thumbnail by:
extracting the first or second predetermined object from one frame of the two frames; and
overlapping the extracted first or second predetermined object with the other of the two frames.

9. The method according to claim 7, further comprising generating the thumbnail by:
extracting the first and second predetermined object from the two frames; and
overlapping the extracted first and second predetermined object with a predetermined background.

10. The method according to claim 7, wherein the first video clip comprises metadata defining a start time and an end time of the first video clip.

11. The method according to claim 7, comprising searching the first video clip based on object or facial recognition, motion, or bounding boxes existing in the first video clip, or searching content metadata associated with the first video clip so as to identify the first and second predetermined object prior to identifying the said first and second frames.

12. The method according to claim 11, wherein searching content metadata comprises sending a search request to an indexing server storing the content metadata and receiving search results from the indexing server indicating video frames which match the search criteria.

13. The method according to claim 12, wherein the content metadata comprises trigger times corresponding to the frames including the first and second predetermined object.

14. The method according to claim 7, wherein the thumbnail comprises an internal border separating one frame or part thereof from the other of the two frames or part thereof, the border being positioned not to conceal the first and second predetermined object.

15. A video processing apparatus, comprising at least one processor configured to:
receive from a user a first query corresponding to a first predetermined object and a second query corresponding to a second predetermined object, and an instruction to generate search results matching any or all of the first and second search queries;
obtain from at least one database a first video sequence of a target area comprising the first predetermined object and a second video sequence of the target area comprising the second predetermined object;
upon receipt of the instruction, determine whether the said first and second video sequences originate from a single video camera and whether a recording period of the first video sequence and a recording period of the second video sequence overlap for a time period; and
in a case where the said first and second video sequences originate from a single video camera and the recording periods of the first and second video sequences overlap for a time period, define at least one first video clip using frames of the first and/or second video sequence (s) from the period of overlap, and present the first video clip to the user as a search result; and
in a case where the user chooses to obtain search results matching any of the first and second search queries and the recording periods of the first and second video sequences do not overlap for any time period, presenting the user with the first and second video sequences as different search results.

16. The video processing apparatus according to claim 15, wherein the said at least one processor is further configured to:
identify a first frame of the first video clip comprising the first predetermined object;
identify a second frame of the first video clip comprising the second predetermined object; and
generate a thumbnail using at least part of the first frame and at least part of the second frame of the first video clip, the thumbnail including the first and second predetermined object.

17. A video surveillance system comprising a video processing apparatus according to claim 16 and a client apparatus comprising a display, the client apparatus comprising at least one processor configured to display at least the said first video clip or the thumbnail of the said first video clip.

18. A video surveillance system according to claim 17, wherein the client apparatus is further configured to display the said first video clip or the thumbnail of the said first video clip without displaying the first and second video sequences from which the said first video clip has been defined.

19. A video surveillance system according to claim 17, further comprising a video camera and a recording server, wherein the recording server comprises a processor configured to:
cause the recording of video sequences captured from the video camera in a database in a storing medium;
receive search queries from the client apparatus;
extract video sequences from the database according to the search queries; and
define and transmit the said one first video clip to the client apparatus.

* * * * *